(12) United States Patent
Collee et al.

(10) Patent No.: US 8,100,077 B2
(45) Date of Patent: Jan. 24, 2012

(54) MOORING SYSTEM

(75) Inventors: Michael Collee, Edinburgh (GB);
Edward Maycock, Edinburgh (GB);
Martin Shaw, Perth (GB); Richard Yemm, Edinburgh (GB)

(73) Assignee: Ocean Power Delivery Limited, Edinburgh (GB)

( * ) Notice: Subject to any disclaimer, the term of this patent is extended or adjusted under 35 U.S.C. 154(b) by 217 days.

(21) Appl. No.: 12/543,257

(22) Filed: Aug. 18, 2009

(65) Prior Publication Data

US 2010/0032951 A1 Feb. 11, 2010

Related U.S. Application Data

(63) Continuation-in-part of application No. 10/572,438, filed as application No. PCT/GB2004/003997 on Sep. 17, 2004, now abandoned.

(30) Foreign Application Priority Data

Sep. 17, 2003 (GB) .................................. 0321768.4

(51) Int. Cl.
*B63B 21/00* (2006.01)

(52) U.S. Cl. .......................... 114/230.2; 114/293; 290/53

(58) Field of Classification Search ................ 114/230.1, 114/230.2, 293, 294; 290/42, 53
See application file for complete search history.

(56) References Cited

U.S. PATENT DOCUMENTS

| | | | |
|---|---|---|---|
| 3,111,926 A | 11/1963 | Shatto, Jr. | |
| 4,155,673 A | 5/1979 | Yashima | |
| 4,193,368 A | 3/1980 | DeGraaf et al. | |
| 4,389,843 A * | 6/1983 | Lamberti | ........................ 290/42 |
| 4,509,448 A | 4/1985 | Pease et al. | |
| 4,727,819 A | 3/1988 | Pollack | |
| 4,781,023 A | 11/1988 | Gordon | |
| 5,044,297 A | 9/1991 | de Baan et al. | |
| 5,061,131 A | 10/1991 | Petty et al. | |
| 5,544,608 A | 8/1996 | Horton, III | |
| 5,743,207 A | 4/1998 | Al-Sabah | |
| 6,216,628 B1 | 4/2001 | Poldervaart | |
| 6,435,124 B1 | 8/2002 | Williams | |

FOREIGN PATENT DOCUMENTS

| | | |
|---|---|---|
| EP | 0 796 784 A1 | 9/1997 |
| EP | 1 283 159 A1 | 2/2003 |
| FR | 2 574 043 A1 | 11/1984 |
| GB | 2 034 652 A | 6/1980 |
| GB | 2 043 008 A | 10/1980 |
| GB | 2 087 819 A | 6/1982 |

(Continued)

OTHER PUBLICATIONS

International Search Report for PCT/GB2004/003997, dated Dec. 12, 2005.
Official Office Action for U.S. Appl. No. 10/572,438, dated May 15, 2008.
Official Office Action for U.S. Appl. No. 10/572,438, dated Oct. 20, 2008.

(Continued)

*Primary Examiner* — Lars A Olson
(74) *Attorney, Agent, or Firm* — Marshall, Gerstein & Borun LLP

(57) ABSTRACT

A mooring system and/or a rigid harness (2) for a floating aquatic structure (1) includes first and second ends, and the first end is pivotably attachable to the structure (1) such that in use the harness (2) may pivot about a single pivot axis (23) through a range of angles relative to, and including, the vertical. The harness (2) further includes one or more mechanical and/or umbilical connections (28,30,32) adjacent the second end thereof.

14 Claims, 28 Drawing Sheets

FOREIGN PATENT DOCUMENTS

| | | |
|---|---|---|
| GB | 2 096 963 A | 10/1982 |
| GB | 2 168 939 A | 7/1986 |
| GB | 2 292 360 A | 2/1996 |
| JP | 61-155506 A | 7/1986 |
| WO | WO-00/17519 | 3/2000 |
| WO | WO-02/10589 A1 | 2/2002 |
| WO | WO-03/013948 A2 | 2/2003 |

OTHER PUBLICATIONS

Official Office Action for U.S. Appl. No. 10/572,438, dated Feb. 24, 2009.
European Search Report for Application No. 09163320.6 dated Aug. 4, 2011.

* cited by examiner

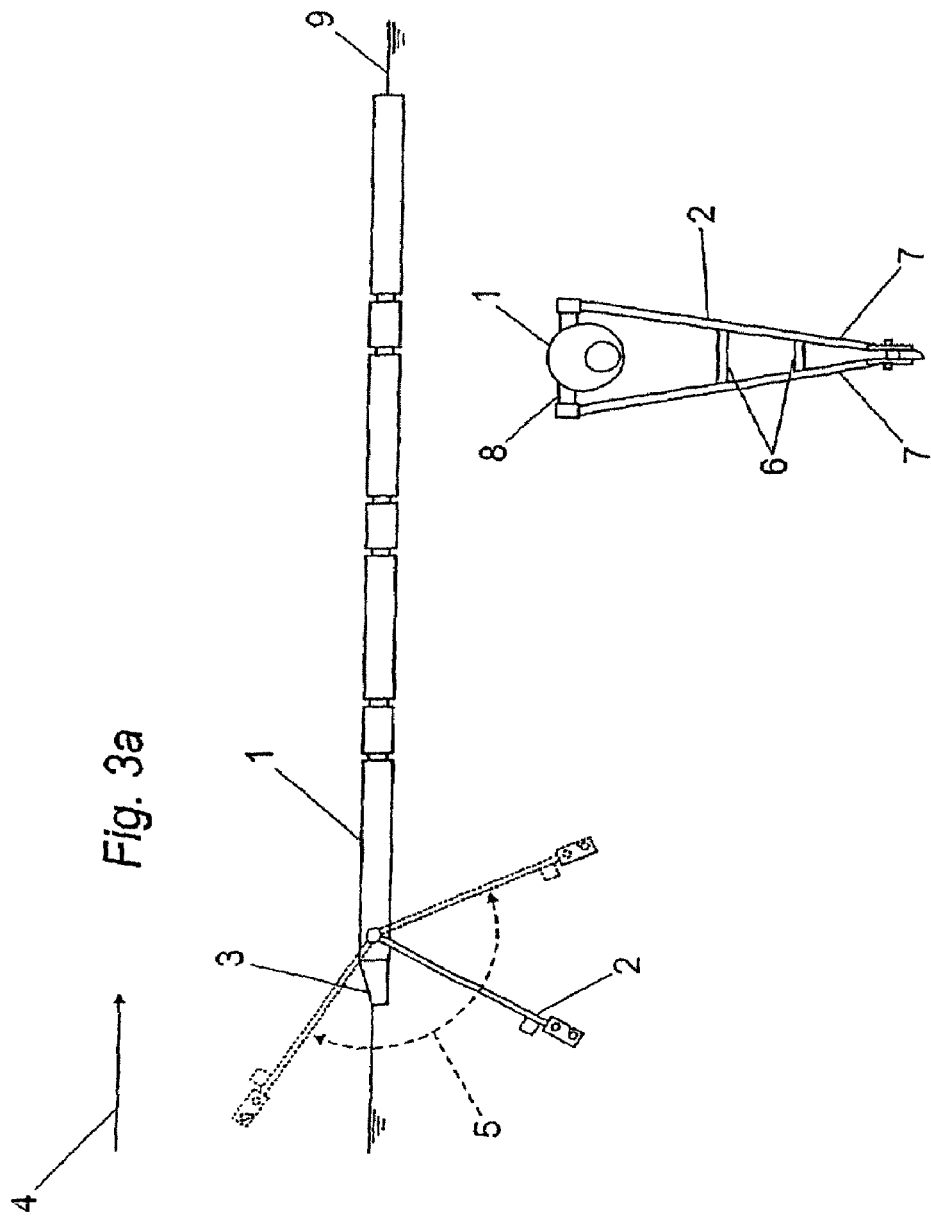

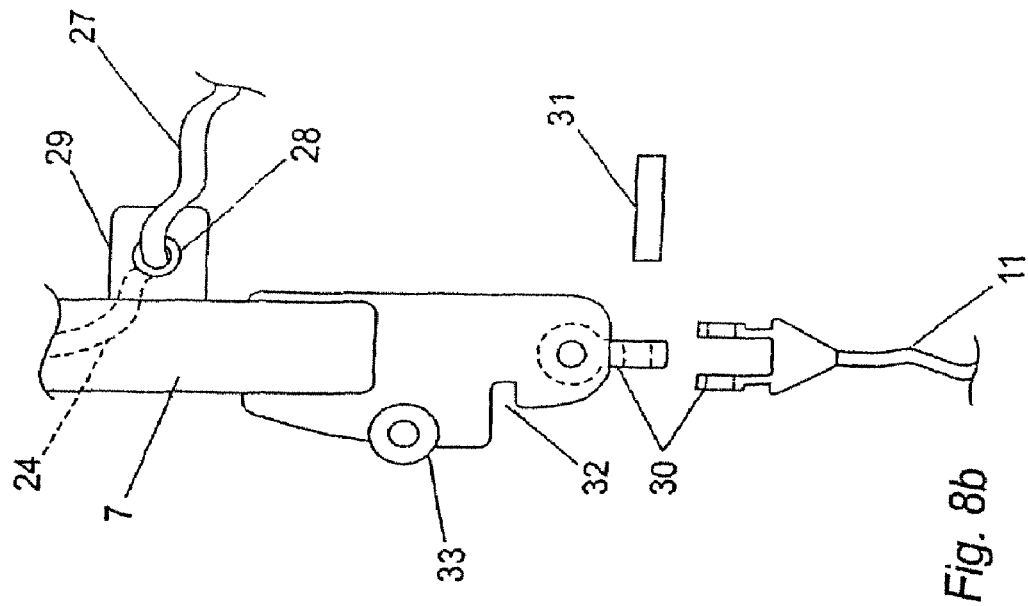
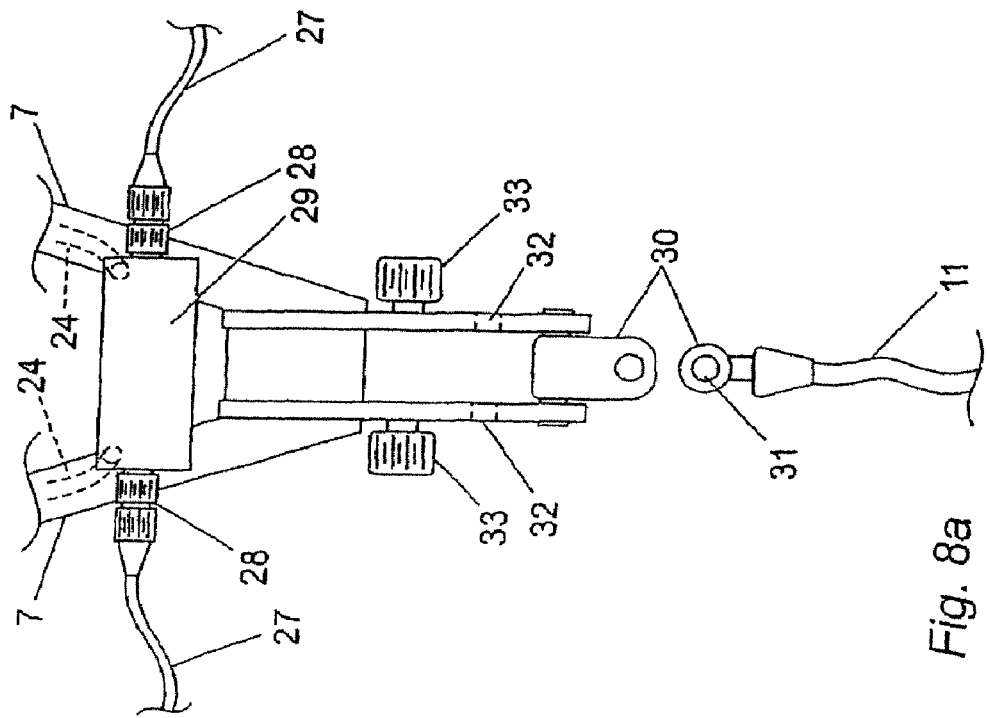
Fig. 8b
Fig. 8a

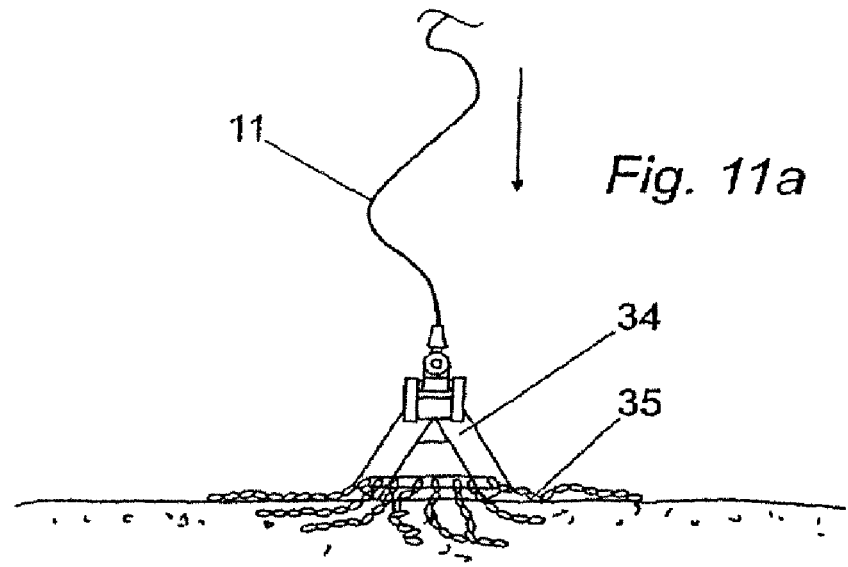
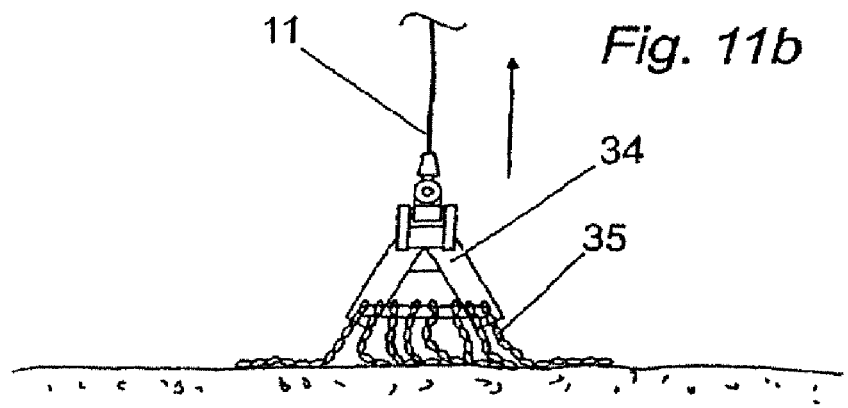
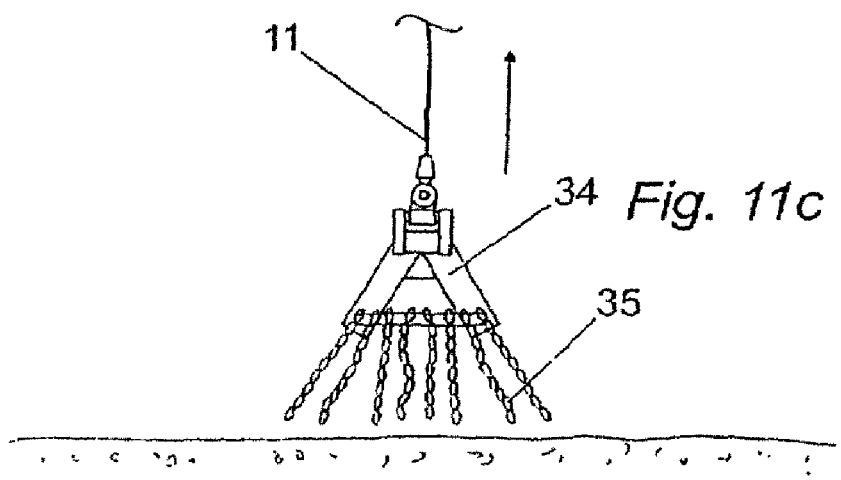

MOORING SYSTEM

RELATED APPLICATIONS

This is a continuation-in-part of U.S. application Ser. No. 10/572,438, which is the U.S. national phase of PCT/GB2004/003997, filed Sep. 17, 2004, which is based on UK 0321768.4, filed Sep. 17, 2003, the entire contents of each of which are hereby expressly incorporated herein by reference.

FIELD OF THE DISCLOSURE

The present invention relates to a system for the mooring and retrieval of floating aquatic installations and structures.

BACKGROUND

Known mooring systems for floating structures comprise a number of anchors, weights and associated tether lines which are attached to the installation or structure. The anchors can take different forms, but each is intended to hold its associated tether line on the bed of the body of water upon which the structure is floating. Additional weights can be added to the anchor lines in order to counter the forces on the structure (e.g. wind, waves or tidal currents) and maintain the position of the structure on the water. Additional mooring and restraint lines can also be incorporated depending on the conditions which the structure is expected to encounter.

One problem with such known mooring systems is that they present problems when the structure has to be retrieved from the water. With the number of tether and restraint lines attached to the structure, it is necessary for these all to be disconnected before the structure can be removed from the water. This normally requires human intervention, with an operator having to climb onto the structure in order to detach the various lines before the structure can be retrieved. In particularly heavy seas or bad weather, this cannot sometimes be done for safety reasons. The retrieval of the structure can therefore be delayed, for days at a time in some instances. Such delay can have serious time and cost implications, with maintenance or installation schedules being affected because of the delays.

A further disadvantage of the known systems is that they are normally intended to moor only one structure per system. If a number of structures are to be installed at the same location, separate anchor points, weights and tether lines are needed for each structure. As a result, the structures need to be a certain distance from one another to avoid fouling the various lines. Having to space the structures from one another in this manner is not an effective use of space. It is often desired to place a number of structures in as small a space on the water as possible, normally for economic, aesthetic or environmental reasons.

Another disadvantage is that known mooring systems do not make efficient use of the available water depth. The excursion required to cope with extreme waves and currents require large ranges of motion before the mooring lines become taut. If mooring lines become taut loads rise extremely fast—a process known as line snatching. This problem becomes serious if the structure is to be moored in shallow water and large waves and/or strong currents. Also, known systems do not make efficient use of the suspended weight of the mooring lines or components. Suspended weight costs money and may itself impart loads on the structure that may be large or undesirable.

Yet another disadvantage is that known mooring systems do not provide for ready, protected connection of the structure to one or more utility supplies such as power, fluid or water. Typically such connection must be made on or near the water surface, independently of mooring line connections.

In addition, a lot of known mooring systems are limited in that they are only intended to encounter loading from a single direction (e.g. a marine structure which is only intended to encounter waves from one direction). Such systems can lack stability if they encounter forces from an unexpected direction. Such forces can lead to rotational or yaw movements of the structure which can cause damage to both the structure and the components of the mooring system.

It is an aim of the present invention to obviate or mitigate one or more of the disadvantages of these known mooring systems.

SUMMARY

According to a first aspect of the present invention, there is provided a mooring system for a floating aquatic structure, the system comprising:

a harness having first and second ends, the first end being adapted to be pivotally attached to the structure;

at least one primary weight removably attached to a connecting line, and suspended on the connecting line from the second end of the harness; and at least one first anchor removably attached to said primary weight by at least one first anchor line, wherein the first anchor is adapted to resist movement of the structure in a first direction.

Preferably, the mooring system further comprises at least one second anchor removably attached to the connecting line by at least one second anchor line, wherein the second anchor is adapted to resist movement of the structure in a second direction substantially opposite to the first direction.

Preferably, the mooring system further comprises a support line having one end adapted to be removably attached to the structure and its other end removably attached to the second anchor line, the support line adapted to restrict yaw motion of the structure.

Preferably, the mooring system further comprises one or more secondary weights attached to one or more of the first and second anchor lines.

In one preferred embodiment the system comprises at least two first anchors removably attached to said primary weight by respective first anchor lines, wherein each first anchor is adapted to resist movement of the structure in the first direction.

Preferably, the at least one primary weight comprises a frame member and one or more chain links suspended from said frame member. The frame member includes at least two first mechanical attachment means adapted to removably attach the connecting line and at least one first anchor line thereto. Most preferably, the first mechanical attachment means are universal joints having detachable pin members.

In a further preferred embodiment, the mooring system comprises:

first and second primary weights attached to first and second connecting lines, respectively, and suspended on the connecting lines from the second end of the harness; and a pair of first anchors having respective first anchor lines, one of the first anchors removably attached to the first primary weight by one first anchor line and the other first anchor being removably attached to the second primary weight by the other first anchor line, wherein the first anchors are adapted to resist movement of the structure in a first direction.

Preferably, the system further comprises a third primary weight attached to a third connecting line and suspended on the third connecting line from the second end of the harness; and at least one second anchor removably attached to the third connecting line by at least one respective second anchor line, wherein the second anchor is adapted to resist movement of the structure in a second direction substantially opposite to the first direction.

Preferably, the system further comprises a support line having one end adapted to be removably attached to the structure and its other end removably attached to the second anchor line, the support line adapted to restrict yaw motion of the structure.

In a still further preferred embodiment, the system further comprises a pair of second anchors each having respective second anchor lines, one of the second anchors being removably attached to the first primary weight by one second anchor line and the other second anchor being removably attached to the second primary weight by the other second anchor line, wherein the second anchors are adapted to resist movement of the structure in a second direction substantially opposite to the first direction.

Preferably, the system further comprises first and second support lines, each support line having one end adapted to be removably attached to the structure and its other end removably attached to one of the second anchor lines, the support lines adapted to restrict yaw motion of the structure.

Preferably, the harness comprises first and second arm members and a shaft member, wherein the arm members have first and second ends and the shaft member is connected between the respective first ends of the arm members to form the first end of the harness, and wherein the shaft member has an axis of rotation about which the harness pivots. The harness is adapted to apply roll restraint to the structure.

Preferably, said shaft member and at least one of said arm members are hollow, the harness further comprising at least one conduit that is at least partially located in the hollow arm member and the shaft member. Preferably, the harness further comprises connecting means for connecting one or more utility supplies to the harness.

Preferably, said connecting means comprises a junction box having one or more connectors therein, the junction box being in communication with the at least one conduit, and the conduit carrying utility supply through the harness to the structure.

Preferably, the harness further comprises retrieval means to facilitate retrieval of the harness from a body of water.

Preferably, the retrieval means comprises one or more slots provided on the harness. Most preferably, the retrieval means further comprises one or more roller members provided on the harness.

Preferably each arm member of the harness contains at least one buoyancy chamber, and the harness further comprises a buoyancy control system adapted to vary the buoyancy of the harness by selectively filling or venting each buoyancy chamber.

Preferably, the harness further comprises a second mechanical attachment means for removably attaching the connecting line thereto. Most preferably, the second mechanical fixing means is a universal joint having a detachable pin therethrough.

Preferably, the at least one connecting line includes a linking plate member, and wherein the at least one second anchor line is removably connected to the connecting line by the linking plate member.

Preferably, the linking plate member includes:

retrieval means adapted to allow the mooring system to be retrieved from the water; and stabilising means adapted to hold the plate member in substantially the same plane during retrieval. Most preferably, the linking plate member further includes locking means adapted to secure the plate member to a marine vessel.

Preferably, the floating aquatic structure is a wave energy converter.

According to a second aspect of the present invention, there is provided weight for a mooring system, the weight comprising a frame member and at least two chain links suspended from said frame member.

Preferably, the weight comprises a plurality of chain links suspended from the frame member.

Preferably, the frame member includes at least two mechanical attachment means adapted to removably attaching components of a mooring system thereto. Most preferably, the mechanical attachment means are universal joints having detachable pin members.

According to a third aspect of the present invention there is provided a recovery apparatus for a marine vessel, the apparatus comprising:

a rotatable drum;

a recovery line having a first end adapted to be removably attached to a portion of an object to be recovered and a second end adapted to be removably attached to the rotatable drum;

a retention means comprising a base member and a retaining member attached to the base member by a spherical bearing, the retaining member being adapted to have a portion of the recovered object removably attached thereto; and a guide means adapted to guide the recovery line over the retaining member during winding and unwinding of the line.

Preferably, said guide means is a ramp having an inclined surface lying in a ramp surface plane, and wherein the retention means is housed on the ramp.

Preferably, the base member is adapted to permit longitudinal movement of the retention means relative to the ramp.

Preferably, the ramp further comprises a guide track in which the base member is located. Preferably, the guide track has first and second portions, wherein the first portion lies at a greater angle relative to the horizontal than the second portion.

In a preferred embodiment, the first guide track portion lies at an angle relative to the ramp surface plane and the second guide track portion is substantially parallel to the ramp surface plane.

Preferably, the guide track includes locking means adapted to lock the retention means in one or more positions on the guide track.

Preferably, the recovery apparatus further comprises a tensioning roller member adjacent a first end of the guide means for tensioning the recovery line.

Preferably, a second end of the guide means terminates adjacent the stern of the marine vessel, and the apparatus further comprises a recovery roller member adjacent the stern of the vessel, the recovery roller member adapted to assist in the recovery of an object onto the guide means.

BRIEF DESCRIPTION OF THE DRAWINGS

Preferred embodiments of the present invention will now be described, by way of example only, with reference to the accompanying drawings, in which:

FIGS. 3(a) and 3(b) are side and end elevations, respectively, detailing a yoke component of the mooring system of FIG. 1;

FIGS. 8(a) and 8(b) are end and side detail views, respectively, of the lower part of the yoke of FIGS. 3(a) and 3(b);

FIGS. 11(a)-(c) show detail views of the tether weight of FIG. 9 in operation;

DETAILED DESCRIPTION

Figures 1A, 1B:
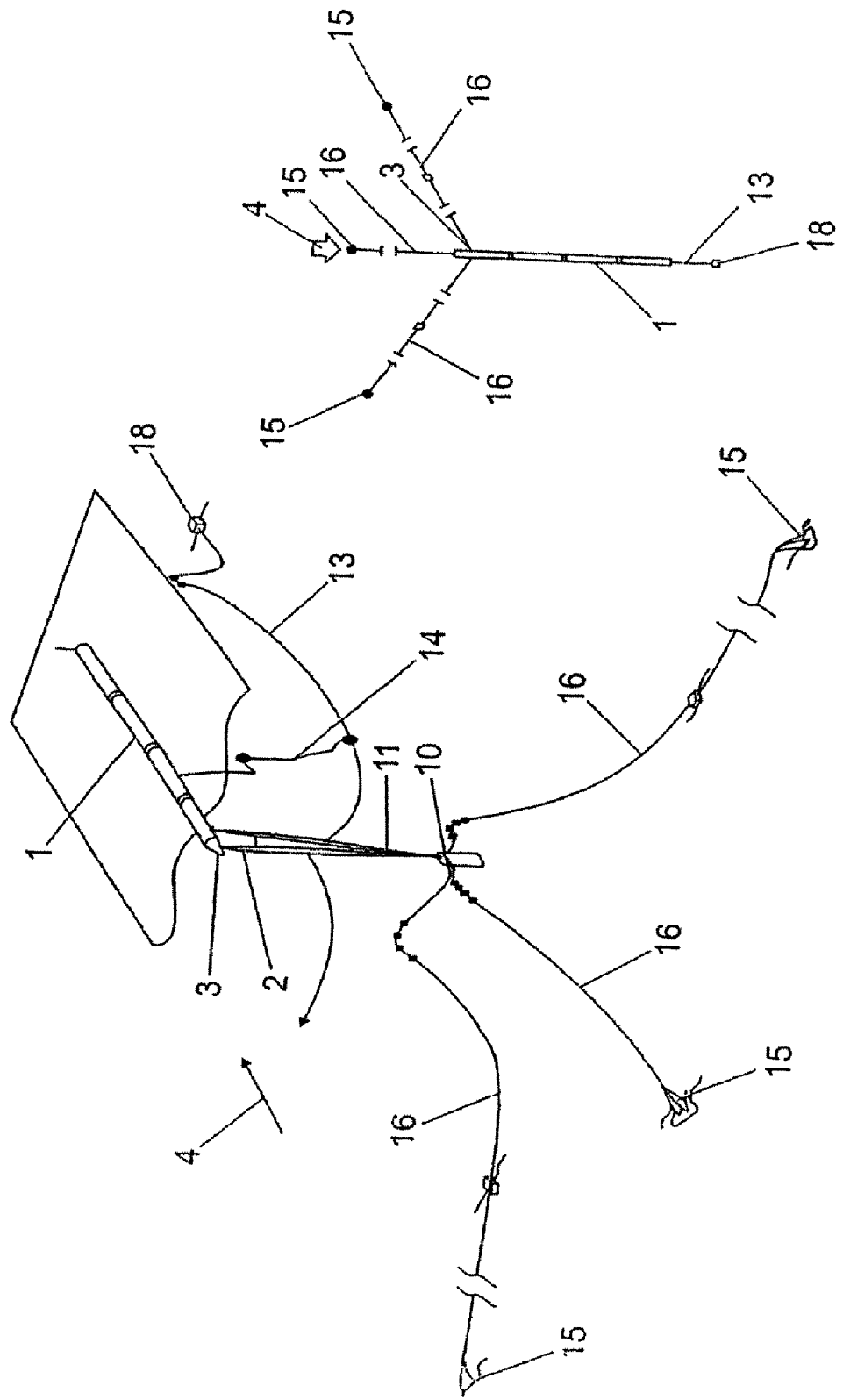
FIG. 1(a) shows a perspective view of a first embodiment of a mooring system used in conjunction with a wave energy converter.
FIG. 1(b) shows a schematic plan view of the mooring system of FIG. 1(a)

A first embodiment of a mooring system for a floating aquatic structure in accordance with the present invention is shown in FIGS. 1(a) and 1(b). The mooring system is intended for use with any structure, marine vessel or installation which requires securing in water at a particular location. However, in the illustrated embodiment, the mooring system is securing a wave energy converter (WEC), which is itself the subject of International Patent Application No PCT/GB99/03204 to the same Applicant. The WEC will therefore not be described further here.

As seen in FIG. 1(a), the WEC 1 floats on the surface of the water and is provided with a pivoting harness or yoke 2 at its front end 3—that is, the end facing in the direction of the anticipated wave action or current. Attached to the yoke 2 below is a connecting or tether weight line 11 to which is secured a primary or tether weight 10. First or front anchor lines 16 are attached to the tether weight arrangement 10 and have first or front anchors 15 of a known type at the ends of the front anchor lines 16 remote from the tether weight arrangement 10. Although, the embodiment shown in FIGS. 1(a) and 1(b) is provided with three front anchors 15 and front anchor lines 16, the system need only utilise one front anchor and front anchor line. Additional front anchors and front anchor lines can be added depending on the operational requirements of the system. Optional secondary or clump weights may also be provided on the front anchor lines 16 to provide additional friction if desired.

Also connected to the yoke 2 is a second or rear anchor line 13 and its associated second or rear anchor 18, again of a known type. A support or yaw line 14 is also connected between the WEC 1 and the rear anchor line 13 to help stabilise the WEC 1, as will be described below. Again, it should be understood that the rear anchor and yaw lines are optional components which may be used in certain applications. FIG. 1(b) shows a schematic plan view of the WEC 1 and front and rear anchor lines 16, 13 when under the action of waves coming from the direction shown by arrow 4.

Figure 2:
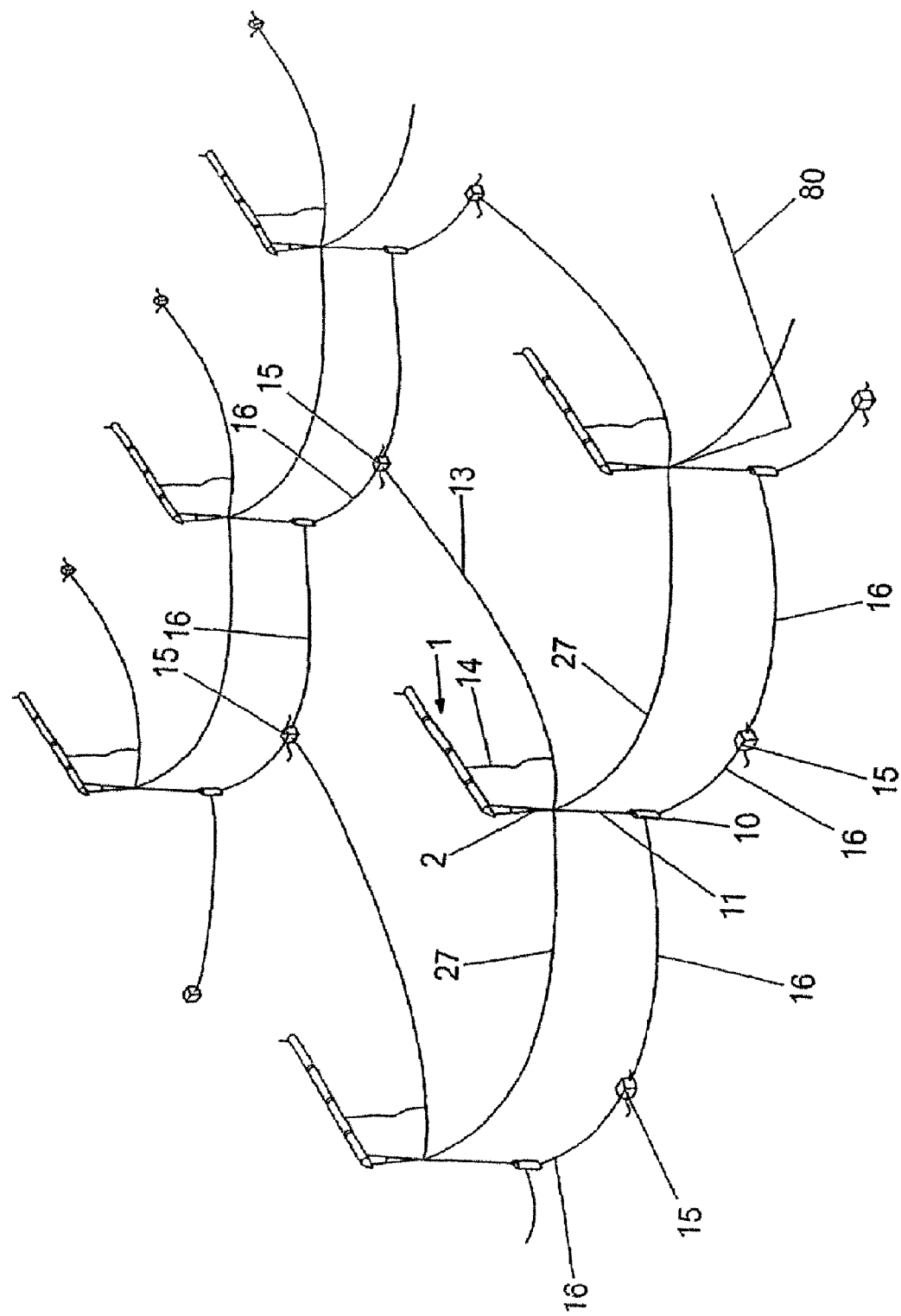
FIG. 2 shows the mooring system of FIG. 1 when applied to an array of wave energy converters.

One of the advantages of the mooring system shown in FIGS. 1(a) and 1(b) is that it is particularly suitable for securing aquatic structures in an array. As shown in FIG. 2, a number of WECs or other structures can be held by shared anchor points on the sea bed and can also share electrical connections and such like. Where an array of WECs 1 is to be moored at the same location, they can be arranged in rows, as shown in FIG. 2. Each WEC 1 has substantially the same mooring system as that described with reference to FIGS. 1(a) and 1(b). However, where the mooring system differs in an array is that the front anchors 15 are shared by adjacent WECs 1. Thus, the front anchor lines 16 of adjacent WECs 1 share the same front anchor 15. Where there is more than one row of WECs/structures, the front anchors 15 of each row also act as the rear anchors of the adjacent row. As shown in FIG. 2, the rear anchor line 13 of the WEC 1 is connected between the tether line 11 of the WEC 1 and the front anchor 15 of the WEC in the next row. In addition to sharing anchors, the adjacent WECs also can also share a variety of utilities via one or more umbilical utility supply lines 27, which in the illustrated embodiment are electrical cables. As will be explained further below, the umbilical lines 27 are adapted so that they may continue to supply utilities around the array, even if one WEC is temporarily removed for some reason. Furthermore, as the umbilical lines are connected "mid-water" (i.e. they lie under the surface of the water but not on the floor of the body of water), only a main supply cable 80 to the array need be on the floor. This avoids the need to have a variety of cables or umbilical lines lying on the floor in addition to the lines of the mooring system.

In the particular embodiment shown in FIG. 2, electrical switchgear is provided in each WEC 1 in order to act as circuit breakers. Thus, if there is a fault in one of the electrical cables 27 connected between two WECs 1 in the array, the circuit breakers in the associated WECs trip in order to isolate the faulty cable. Thus, the array can continue to operate whilst the faulty cable is replaced.

FIGS. 3(a) and 3(b) show the yoke 2 of the mooring system in more detail. The yoke 2 is designed to pivot relative to the WEC 1 in a substantially vertical plane (when viewed in FIGS. 3(a) and 3(b)) through a large angle range 5, both above and below the surface 9 of the water. This allows the yoke 2 to pivot about the front end 3 of the WEC 1 so that the lower end of the yoke 2 can be recovered to the surface 9 without removing any attachments, as will be explained below. The yoke 2 is also adapted to pivot in order to allow the WEC 1 to move on its moorings without the yoke 2 and the WEC 1 coming into contact.

Referring now to FIG. 3(b), it can be seen that the yoke 2 comprises a pair of arm members 7 which are connected together at their lower ends. The first or upper ends of the arm members 7 are also connected to respective ends of a hollow shaft member 8, such that the yoke 2 is substantially triangular in shape. The yoke 2 may also be provided with one or more crossbrace members 6 which allow the yoke 2 to spread the mooring loads. The crossbrace member(s) 6 strengthen the yoke 2 whilst still allowing it to pivot about the front 3 of the WEC 1.

Figure 4A:
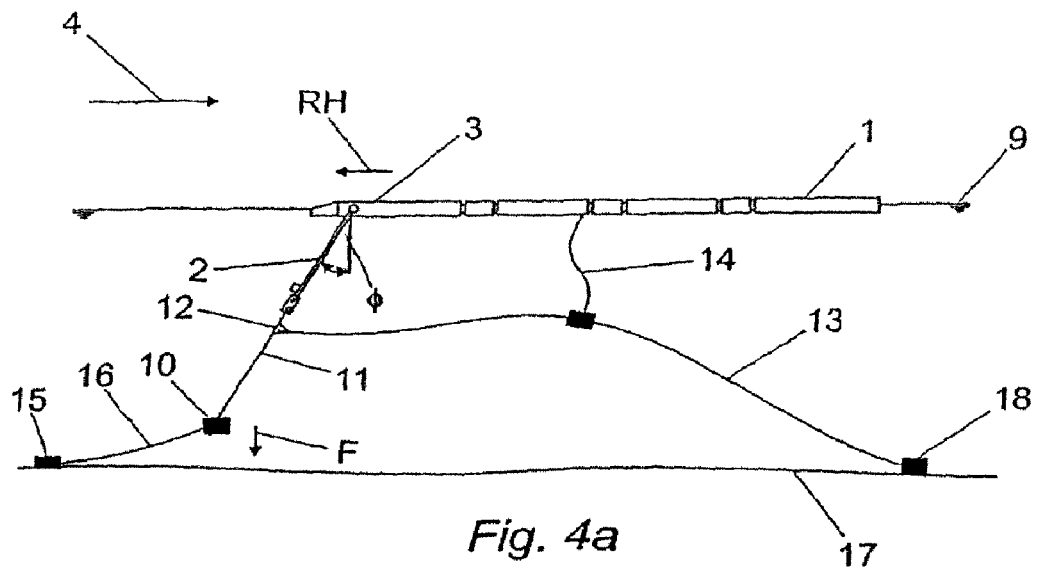
FIGS. 4(a) and 4(b) are side elevations showing the mooring system of FIG. 1 in operation.
Figure 4B:
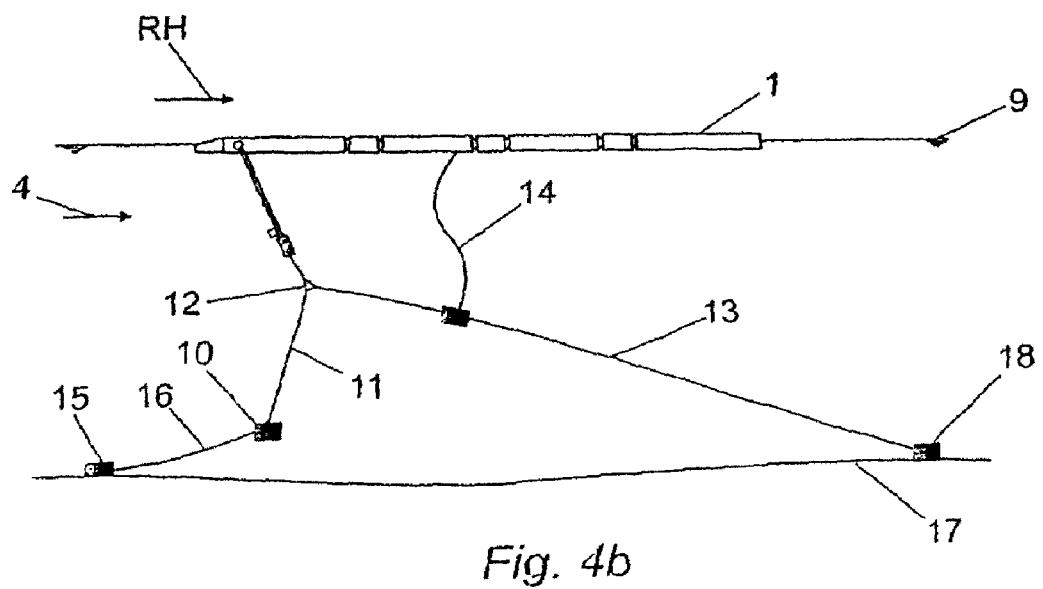

FIGS. 4(a) and 4(b) show how the mooring system provides restorative forces to the WEC 1 when it is subjected to wave action. As described above, the lower end of the yoke 2 is connected to the tether weight 10 by the tether line 11. The rear anchor line 13 and rear anchor 18 are connected to the tether line, preferably by a link plate 12, although they may be attached by any other suitable means. The tether weight 10 is linked to the front anchors 15 using the front anchor lines 16. At rest, the system is arranged such that the tether weight 10 is suspended just off the sea bed 17. The rear anchor line 13 is connected to the rear anchor 18 at the rear of the WEC 1 and mooring system to provide restraint should the WEC 1 and system move forwards.

FIG. 4(a) shows how the system generates a restoring force RH for rearward displacement of the WEC 1 under wave action from the direction illustrated by arrow 4. During the rearward displacement, the yoke 2 and tether line 11 adopt an angle f to the vertical which generates a restoring force RH back to the rest position due to the effect of the tether weight 10. The system remains linear in behaviour for angles f up to approximately 30 degrees (approximately half water depth). After this, the restoring force RH becomes more non-linear with displacement but 'snatching' is avoided for angles less than approximately 60 degrees (approximately 85% of water depth). As will be understood by those skilled in the art, snatching occurs when a slack mooring line is suddenly subjected to a high load. An example of snatching occurs when the tether weight is lying on the seabed and the slack tether line is subjected to a high load by movement of the structure. As the line goes taught, the tether weight will be lifted from the seabed, the inertial and possible suction forces on the weight as it lifts from the sediment on the bed can also increase the load on the tether line. These sudden loads on the line are known as snatch loads.

FIG. 4(b) shows how the system generates a restoring force RH for forward displacements towards the direction 4 of the waves. The rear anchor 18 and rear anchor line 13 act on the bottom of the yoke 2 to generate an angle on the yoke. This leads to a restoring force RH as shown.

Figure 5A:
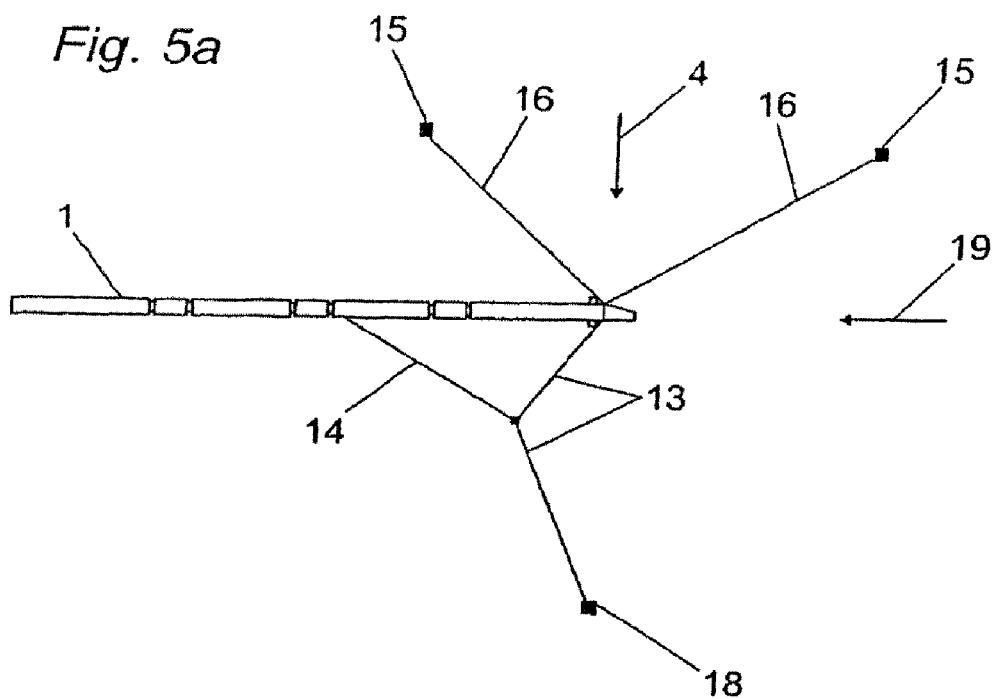
FIGS. 5(a) and 5(b) are plan views showing the mooring system of FIG. 1 in operation.
Figure 5B:
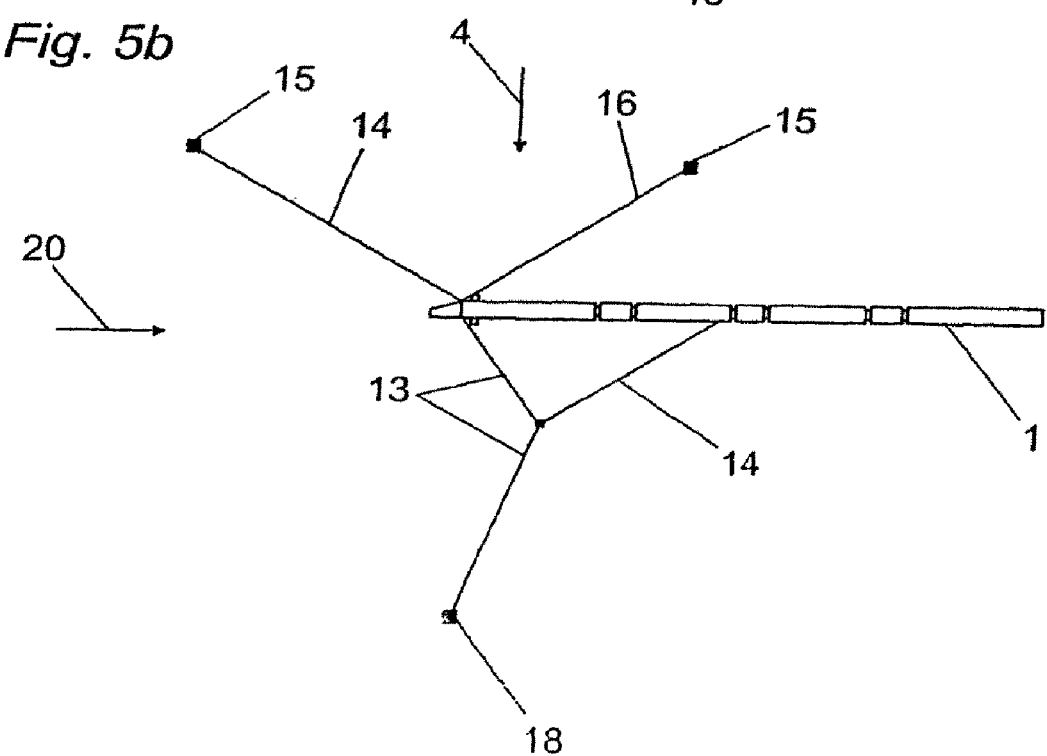

The mooring system allows the WEC 1 to yaw about the vertical axis in response to changes in the incident wave direction, as shown in FIGS. 5(a) and 5(b). The available range of motion is limited by the yaw line 14 acting in conjunction with the rear anchor line 13. The lengths of these lines 13,14 can be chosen to limit the yaw motion if necessary. The yaw limit would typically be +/−90 degrees relative to the expected direction 4 of incoming waves for a coastal location. FIG. 5(a) shows a typical limiting angle for waves coming from the starboard direction shown by arrow 19. FIG. 5(b) shows a typical limiting angle for waves coming from the port direction shown by arrow 20. If more yaw angle is required the mooring system can be provided with a swivel to allow it to rotate fully, and electrical/other interconnection would be through slip rings or similar means.

Figure 6:
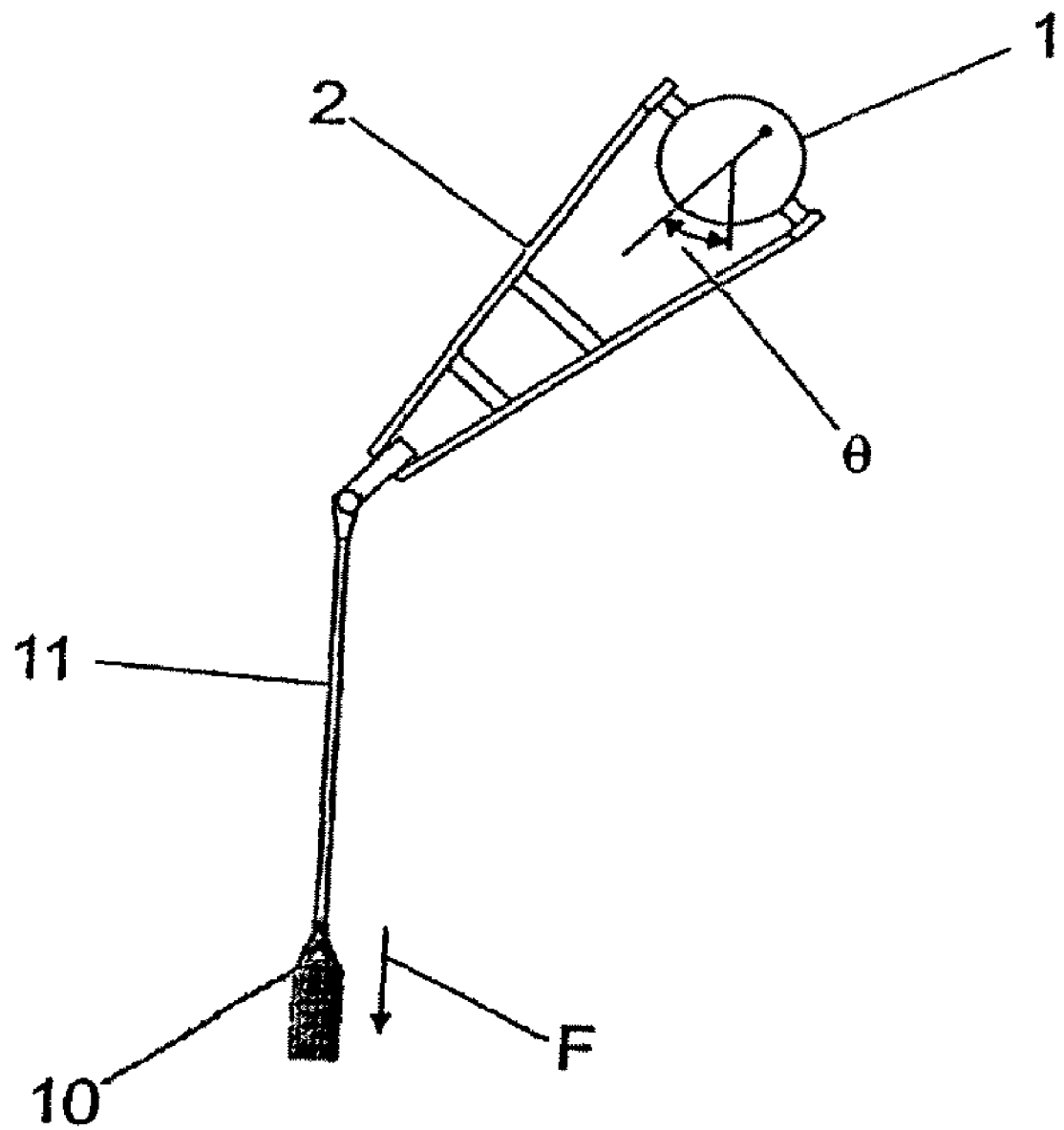
FIG. 6 is an end elevation of the yoke of FIGS. 3(a) and 3(b) in operation.

A further function of the mooring system is to provide greater rotational stability about a particular axis. For the WEC illustrated, the mooring system is used to provide additional roll stability. The yoke 2, tether line 11 and tether weight 10 combine to give the WEC additional roll stability about its longitudinal axis, as shown in FIG. 6. With the tether weight 10 attached to its lower end, the yoke 2 behaves in the same manner as the keel of a yacht, producing a counteracting force to counter the roll action of the WEC.

Figure 7:
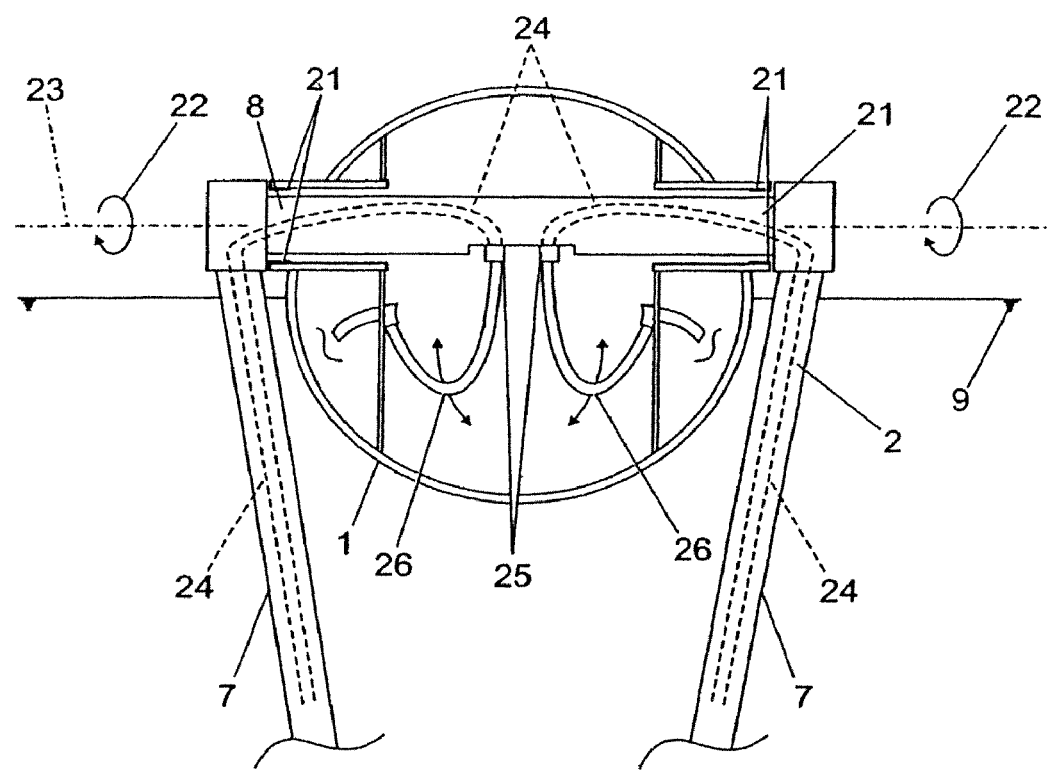
FIG. 7 is an end detail view of the upper part of the yoke of FIGS. 3(a) and (b)

FIG. 7 shows a detail view of the upper part of the yoke 2. The two arm members 7 of the yoke 2 are connected to respective ends of a hollow shaft 8. The shaft 8 provides a structural link between the arm members 7, which ensures that the yoke 2 is a rigid, structurally efficient frame able to withstand large mooring loads while remaining relatively lightweight. The shaft 8 is located in a housing at the front end 3 of the WEC 1 and bearings 21 are provided between the shaft 8 and the housing. These bearings 21 allow low friction rotation 22 of the yoke about the rotational axis 23 of the shaft 8. Conduits 24 are also provided which are located within either one or both of the arm members 7 and the shaft 8. The conduits 24 allow electrical and communications wiring, and/or hydraulic or other lines to run between the upper and lower ends of the yoke 2. The conduits 24 exit the shaft 8 at one or more exit apertures 25 with the flexible end portions 26 of the conduits 24 connecting to the WEC 1. The flexible end portions 26 are designed to allow the yoke 2 to pivot freely about the rotational axis 23 of the shaft 8 while minimising strain on the internal wires or other lines. This allows all internal/external connections to the yoke 2 and machine 1 to be made at the lower end of the yoke 2. As a result, the connection/disconnection of the WEC 1 from the mooring system can be done without needing human intervention on the WEC 1 whilst in the water. The arrangement also protects the wiring and other connections from the water.

FIGS. 8(a) and 8(b) show details views of the lower end of the yoke 2. The lower ends of the arm members 7 meet to form the corner or apex of the substantially triangular yoke 2. All of the mechanical, electrical and/or other connections to the machine are housed at this lower end of the yoke 2. These connections typically comprise flexible umbilical utility supply lines 27 which usually contain electrical, communication, hydraulic or other lines interconnecting adjacent WECs in an array such as that shown in FIG. 2, or connecting the WEC to main supply lines on the sea bed. In the embodiment shown, the umbilical lines 27 between adjacent WECs 1 are made "mid-water". In other words, the umbilical lines 27 lie below the surface of the water, but are not in contact with the sea bed. These umbilical lines 27 are connected via sealed connectors 28 to a connecting means in the form of a junction box 29 mounted on the yoke 2. The junction box 29 is linked to the conduits 24 to provide a path for the various lines to the upper part of the yoke 2 and then subsequently into the WEC 1, as shown in FIG. 7. If two umbilical lines 27 are used, the connectors 28 are designed to be a male/female mating pair so that they can be connected together in order to maintain continuity for an array of WECs if this particular WEC 1 and yoke 2 are off-site for any reason.

The lower part of the yoke 2 also includes the main mechanical attachment to the tether line 11. In the illustrated embodiment, this is provided by a universal joint 30 to allow free motion about two perpendicular rotational axes and to minimise wear of the connection in service. This connection is made using a single pin 31 to allow straightforward and rapid attachment and removal of the tether line. In addition, back-up lines (not shown) may be provided to maintain integrity of the mooring system in the event of failure of any of the components.

The lower part of the yoke 2 is also provided with a retrieval means to allow easier retrieval of the yoke 2 onto the rear of an installation/removal vessel, as will be described further below. This retrieval means comprises profiled slots 32 or may alternatively comprise a ball and socket joint (not shown) or any similar connection. In addition, to facilitate simple, safe recovery of the yoke 2 onto the vessel, skids or rollers 33 are also provided. These allow the system to be easily and safely pulled up over stern of the vessel and guide the end of the yoke 2 into a latching means. Further guides, rollers, or latches may also be added to aid the safe and rapid recovery of the yoke 2.

Figure 9:
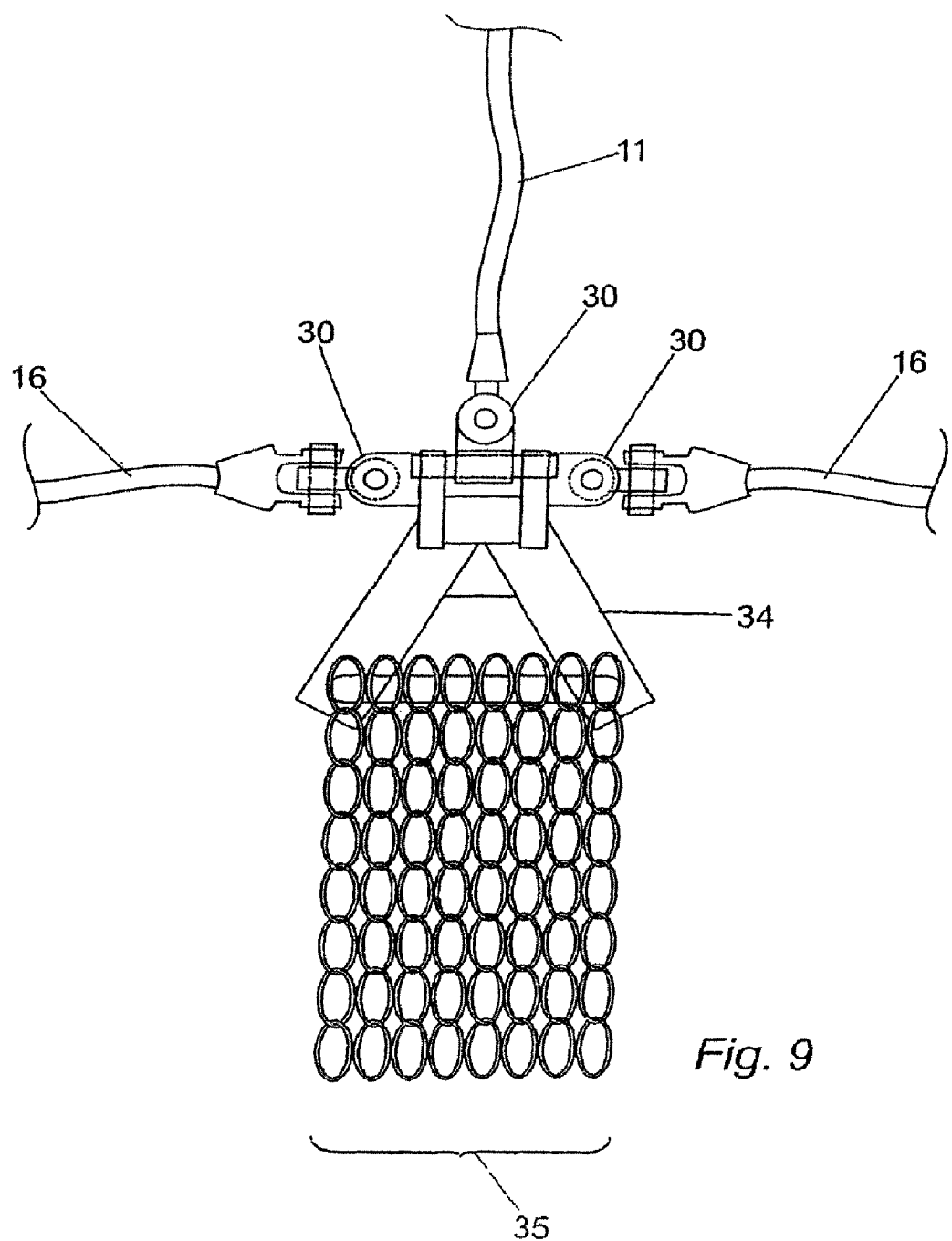
FIG. 9 is an end elevation of a tether weight component of a mooring system.
Figure 10A:
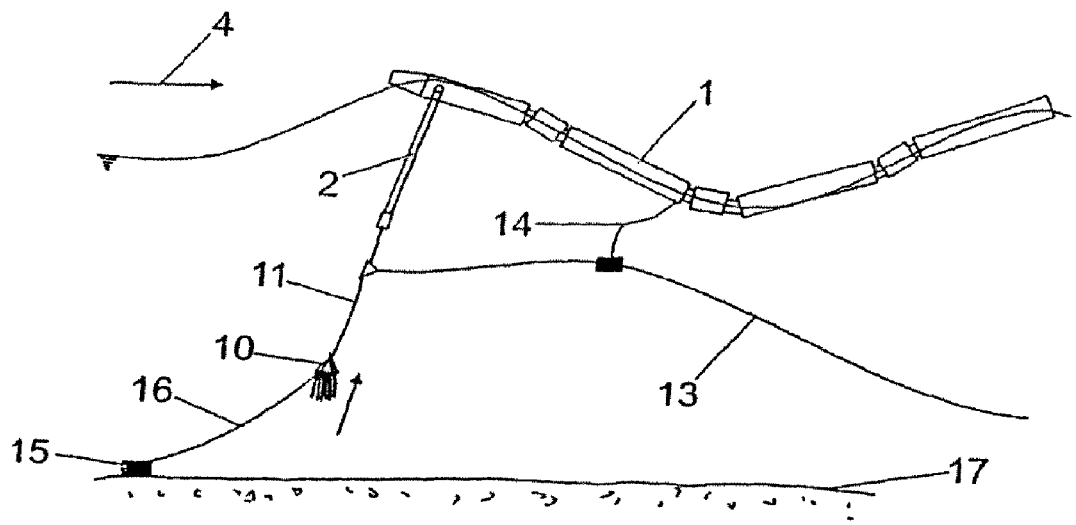
FIGS. 10(a) and 10(b) show the tether weight of FIG. 9 in operation with the mooring system of FIG. 1.
Figure 10B:
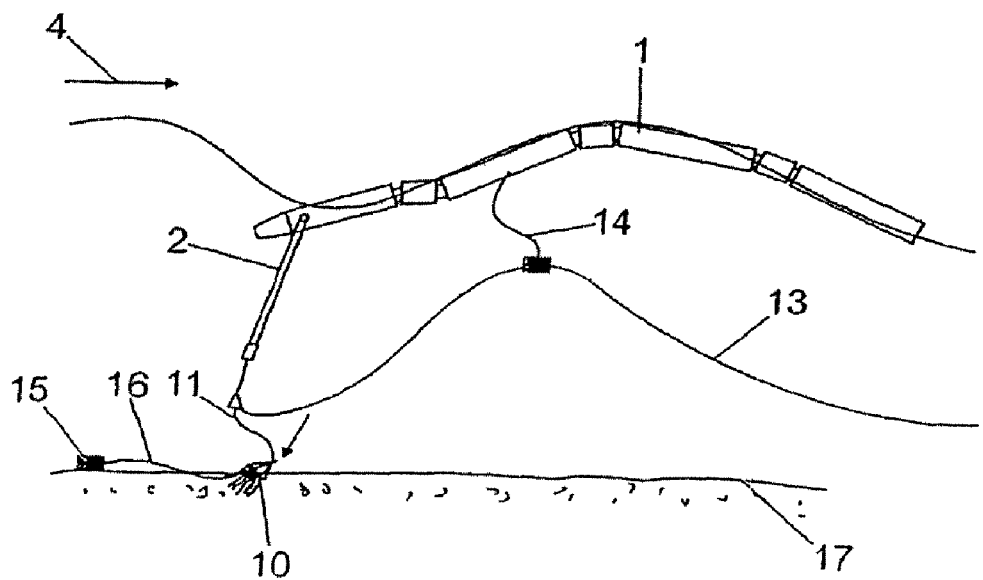

A tether weight 10 which is used in the mooring system is shown in FIG. 9. The tether weight 10 comprises a frame member 34 for attachment to the tether line 11 and the front anchor lines 16 and any other ancillary or back-up lines (not shown). The attachment of the various lines is again made using universal joints 30 to allow full and free motion and minimise wear of the connection. Loops or lengths of chain links 35 are suspended from the frame 34 to provide the weight required to generate the mooring reaction forces, as will be described below.

The operation of the tether weight 10 is shown in FIGS. 10 and 11(a)-(c). The mooring system is arranged such that when it is not experiencing any displacement forces from the water, the tether weight 10 is positioned as close as possible to, or partially resting on, the sea bed 17. In large waves, the vertical motion or pitch of the WEC 1 may be great, as shown in FIGS. 10(a) and 10(b). When the front 3 of the WEC 1 is on top of a wave crest, as shown in FIG. 10(a), the tether weight 10 will be lifted away from the sea bed 17. Conversely, when the front of the machine is in a wave trough, as shown in FIG. 10(b), the tether weight 10 will fall onto the sea bed 17 unless sufficient clearance is provided.

With known tether weights, it is undesirable for the weight to touch the sea bed. However, the clearance required from the sea bed would seriously compromise the linear range of motion if the tether weight is not allowed to touch down on the sea bed. The tether weight 10 shown in FIG. 9 allows a progressive pick-up from the sea bed, as shown in FIGS. 11(a)-(c). The chain links 35 are progressively picked up by the frame 34, ensuring a smooth increase in the mass of the tether weight 10 as it rises from the sea bed 17.

Figure 11D:
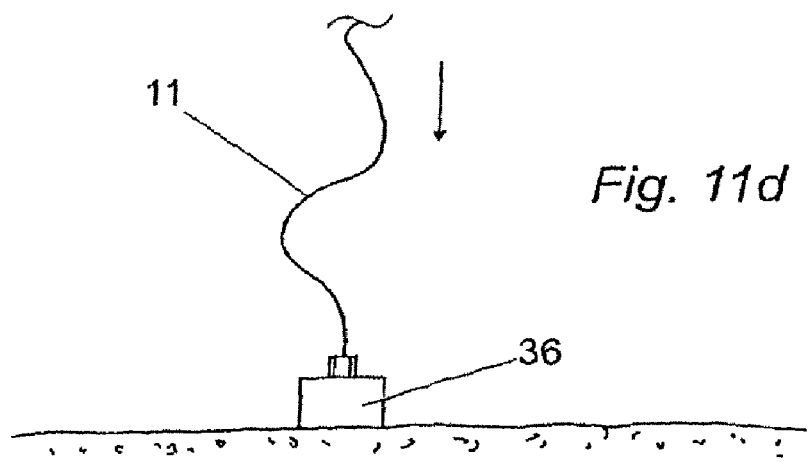
FIGS. 11(d) and 11(e) show detail views of a prior art tether weight in operation.
Figure 11E:
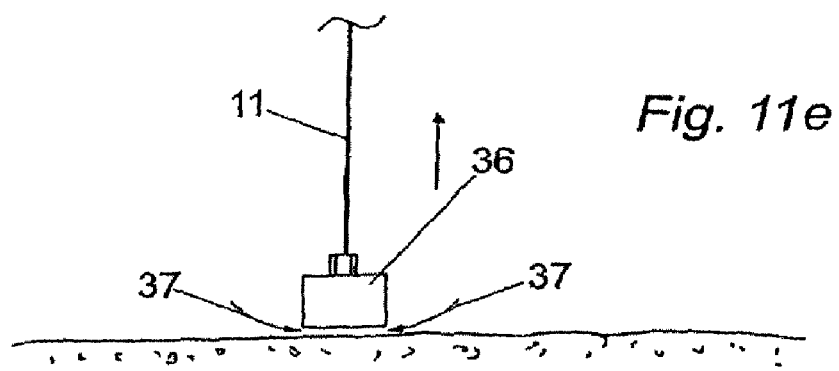
Figure 11F:
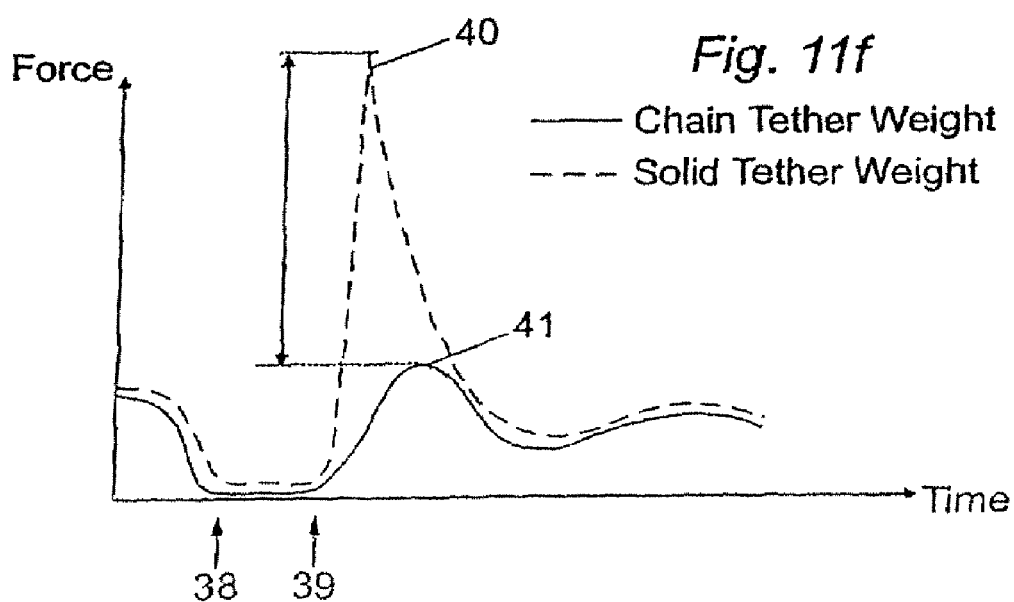
FIG. 11(f) shows a graph detailing the comparative loads put on the tether line by the tether weight of FIG. 9 and the prior art tether weight of FIGS. 11(d) and 11(e)

The problem with known solid tether weights touching down on the sea bed is illustrated in FIGS. 11(d)-(f). When a solid tether weight 36 hits the sea bed, the tether line 11 goes slack. When the next wave crest comes along, the tether line 11 tightens again as the tether weight 36 is lifted back off the sea bed, and the resultant accelerations involved are very high, putting large snatch loads on the line 11. As the solid tether weight 36 is lifted from the sea bed, it can also be subjected to a suction effect by the mud and sediment on the sea bed, which worsens the aforementioned snatch load on the tether line 11. Thus, with known solid weights 36 an extreme snatch load on the tether line 11 will be encountered as the tether weight is lifted from the sea bed under the wave action.

FIG. 11(f) shows how the load in the tether line would vary with time for both types of tether weight during the passage of a large wave. The time represented by point 38, the tether weights are resting fully on the sea bed. At the time represented by point 39, the tether line tightens as the weights start to be lifted back off the sea bed. The large snatching load 40 with the solid tether weight is caused by the rapid vertical acceleration of the moored structure during the wave action and the suction effect of the sea bed sediment on the tether weight. This snatching load is many times larger than the normal loads intended for the tether line to encounter in service, and can lead to damage and, in extreme cases, failure of the tether line. In using a tether weight as shown in FIG. 9, the weight rises from the sea bed more progressively, and a much smaller snatch load 41 is placed on the tether line, as shown in the graph of FIG. 11(f).

One of the advantages of the mooring system as described above is that the moored machine or structure can be disconnected whilst out of the water. In this way, there is no need for an operator to either be in the water or on the structure during the connection or disconnection. This is facilitated thanks to the yoke, as it houses the connections to the utility umbilical lines and the tether weight and anchors. As will be explained below, the yoke remains attached to the machine/structure when the umbilical line(s) and connecting line to the tether weight are disconnected, thus allowing the remainder of the mooring system to remain in the water when the structure and yoke are retrieved.

Figure 12A:
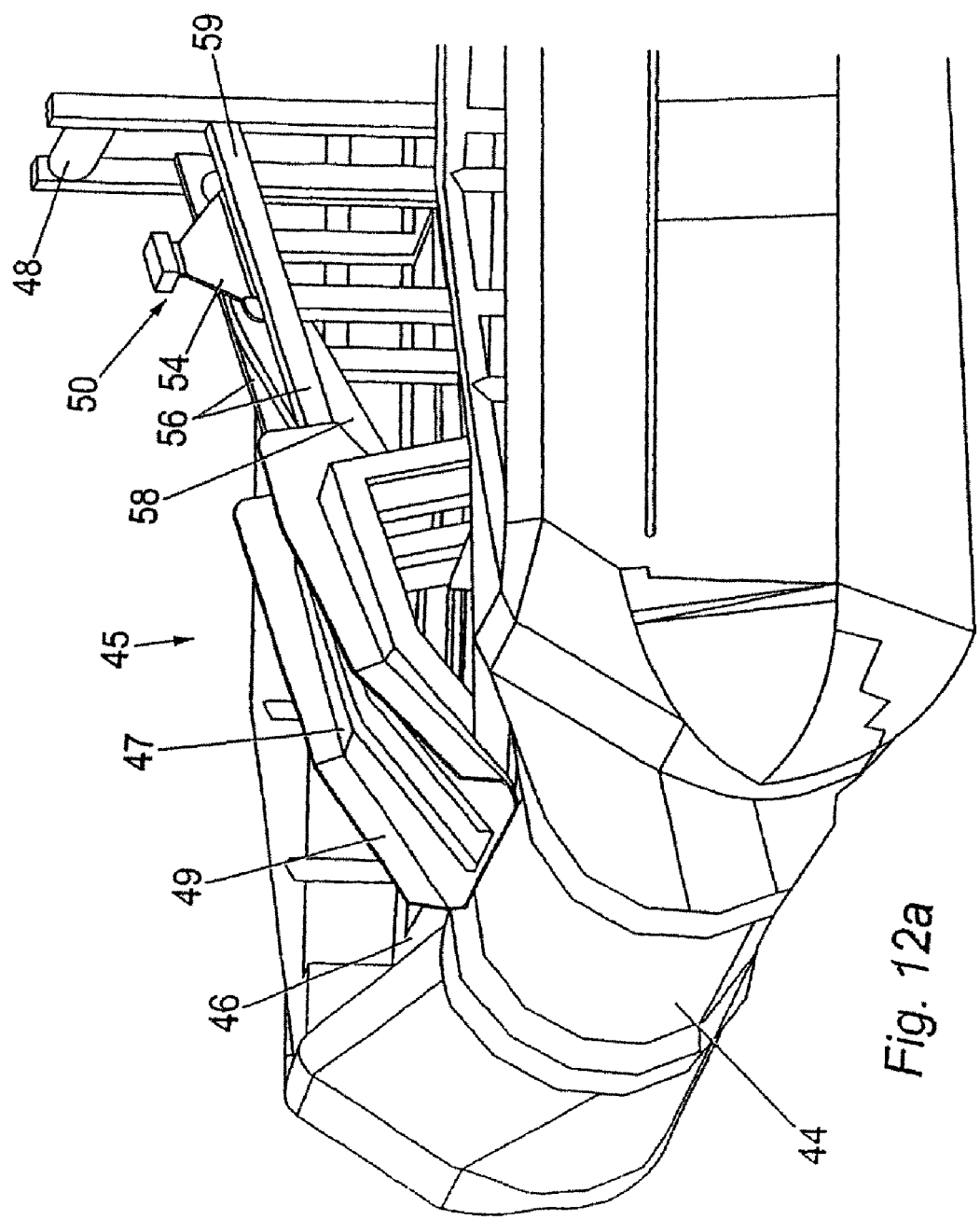
FIGS. 12(a) and 12(b) show detail views of a recovery apparatus for retrieving the yoke component of a mooring system.
Figure 12B:
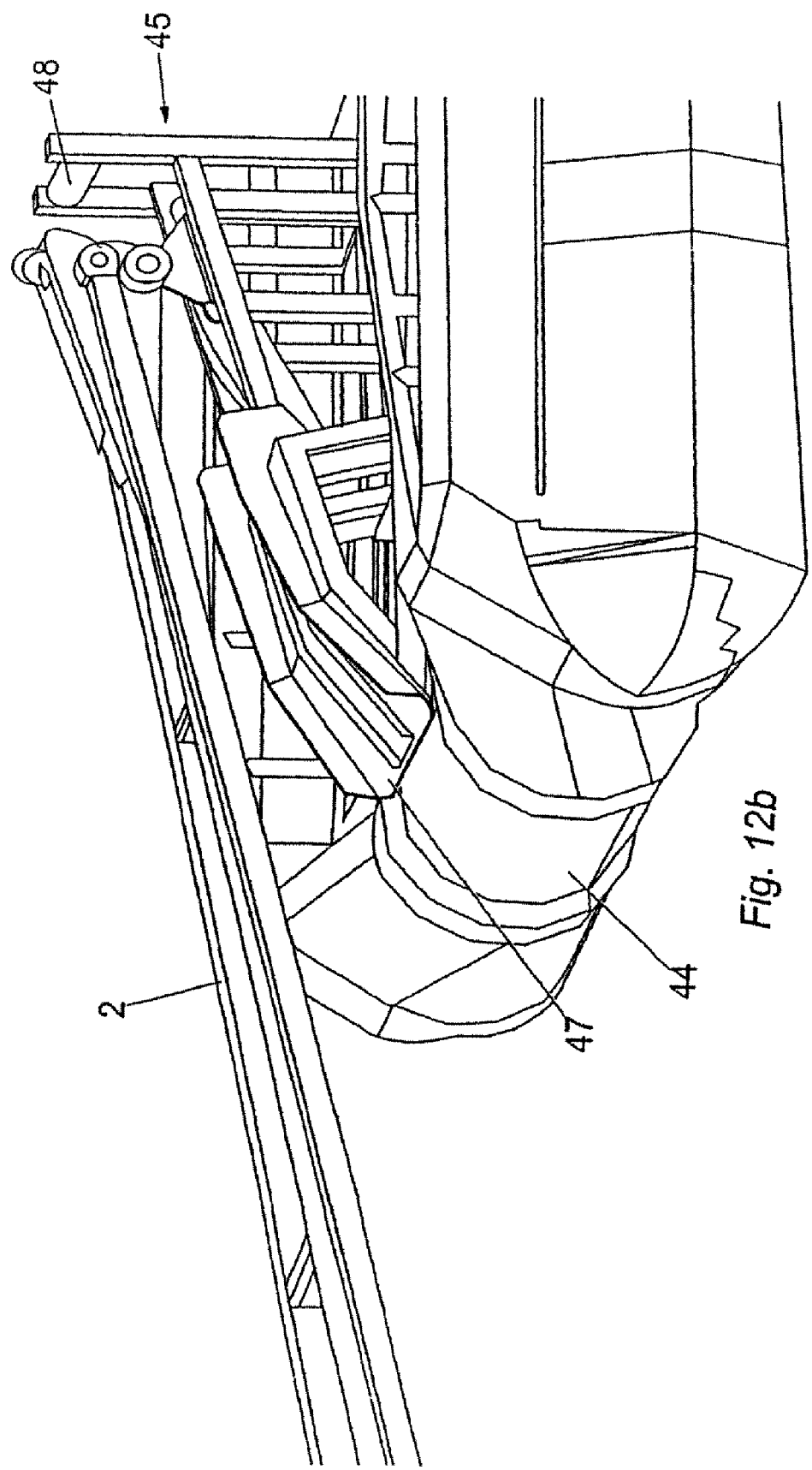
Figure 14A:
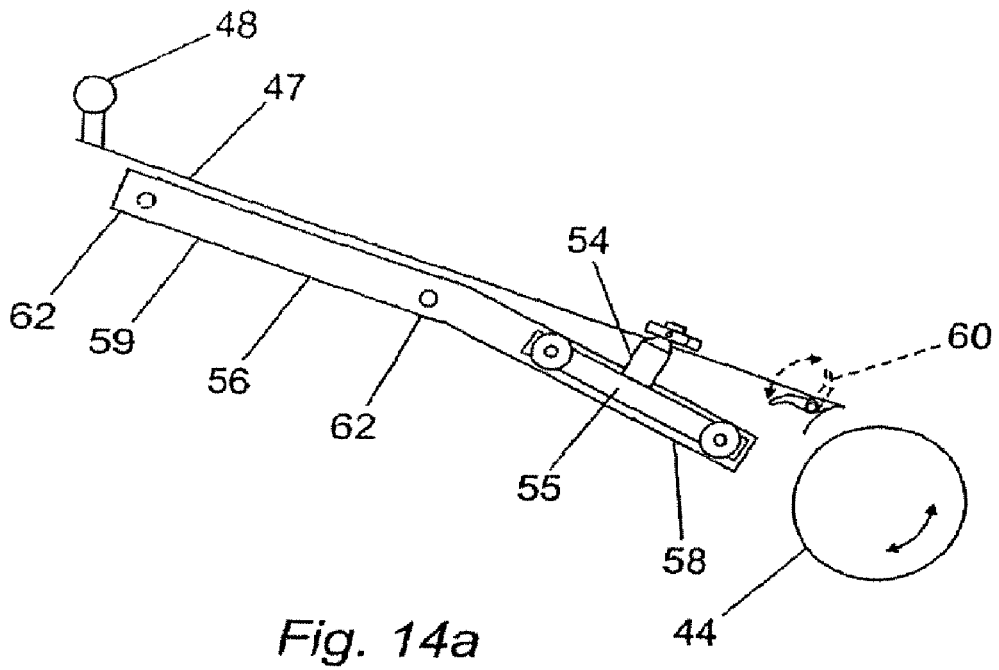
FIGS. 14(a) and 14(b) schematically show the various components of the recovery apparatus shown in FIGS. 12(a) and 12(b)
Figure 14B:
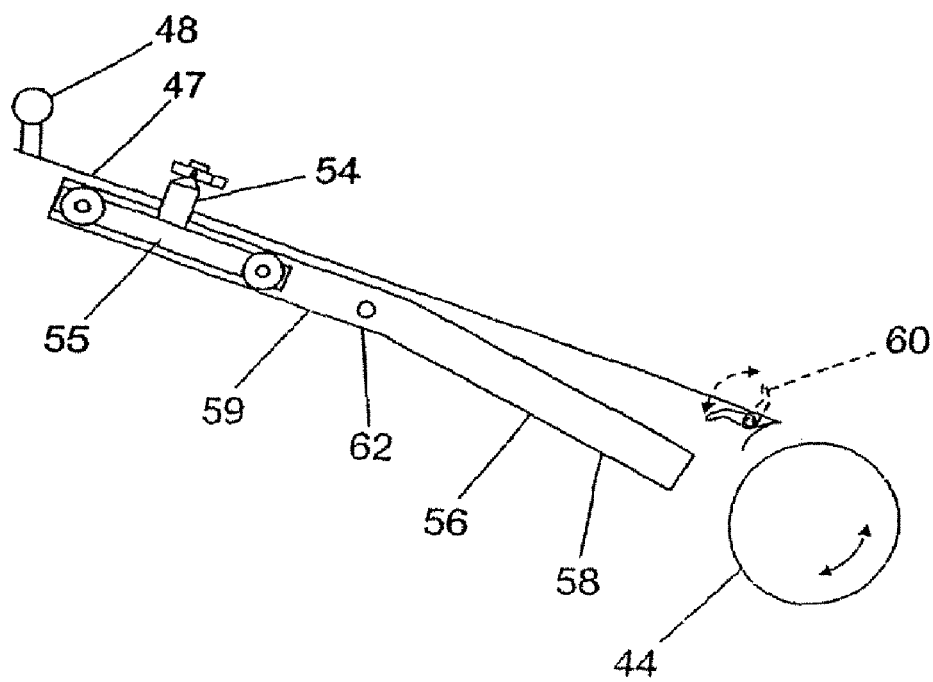

In order to permit the connection and disconnection of the mooring system out of the water, a recovery or retrieval apparatus is required for retrieving the yoke from the water. An example of such an apparatus is shown in FIGS. 12(a) and 14(b). The retrieval apparatus 45 is installed on the deck 46 of a support vessel and is arranged to hold the end of the yoke 2, as shown in FIG. 12(b), during connection or disconnection of the remainder of the mooring system. The structure and yoke can then be towed to a suitable location for the maintenance work, or else they can be lifted onto a barge or the like for maintenance or transportation.

The retrieval apparatus is provided with a ramp 47 onto which the lower end of the yoke 2 is recovered, as has been previously described with reference to FIGS. 12 and 13. The ramp 47 has an inclined surface which lies in a ramp surface plane. The rear end of the ramp is inclined at an angle to the ramp surface plane in order to help with the recovery of the yoke. Furthermore, either the rear of the vessel itself or the ramp 47 is provided with a recovery roller or drum 44 to ensure the smooth recovery or deployment of the various lines and umbilicals attached to the yoke 2. A tensioning roller 48 is also provided at the top end of the ramp 47 to ensure that the recovery line 42 is pulled onto its drum (not shown) at the proper angle and tension. Guide plates 49 are located on either side of the ramp 47 to guide the yoke 2 onto a retention means 50 of the apparatus 45.

Figure 13C:
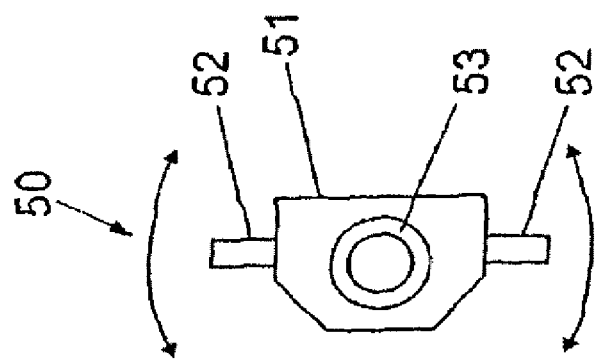
FIGS. 13(a)-(c) show end, side and plan views of an attachment mechanism of the retrieval apparatus.
Figure 13B:
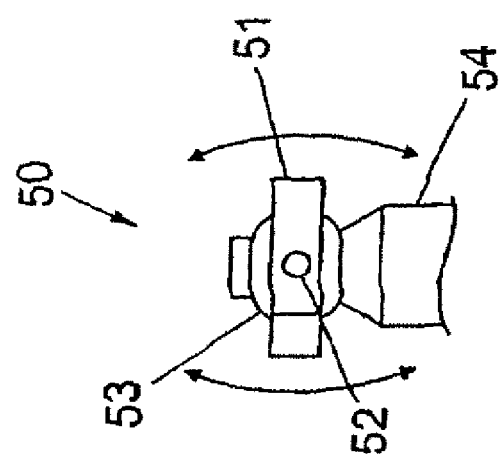
Figure 13A:
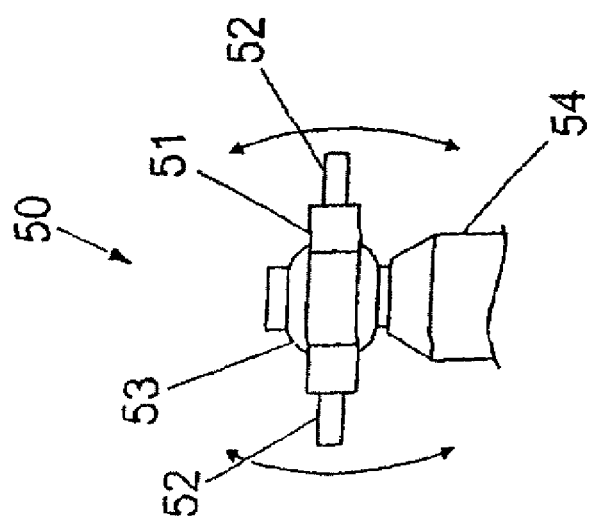

As seen best in FIGS. 13(a)-(c), the retention means 50 comprises a retaining member or block 51 which has a pair of coaxial bars 52 on either side thereof. The block 51 is mounted on a spherical bearing 53 which ensures that the block 51 can move in all three axes (i.e. move in any roll, pitch or yaw motion). The bearing 53 and block 51 are mounted on a base member comprising a pedestal 54 mounted on a carriage 55, as shown in FIGS. 14(a) and 16(b).

The carriage 55 has a number of rollers 57 which are housed within a set of guide tracks 56 so that the whole retention means may move longitudinally relative to the ramp 47. As can be seen in FIGS. 14(a) and 16(b), the guide tracks 56 have first and second, or lower and upper, portions 58,59 which are at different angles relative to the horizontal. The lower portion 58 is at a steeper angle to the ramp surface plane in order that the attachment block 51 lies generally in the ramp surface plane when the yoke 2 is pulled onto the ramp 47. The upper portion 58 of the guide track 56 is substantially parallel to the ramp surface plane.

Figures 15A, 15B, 15C:
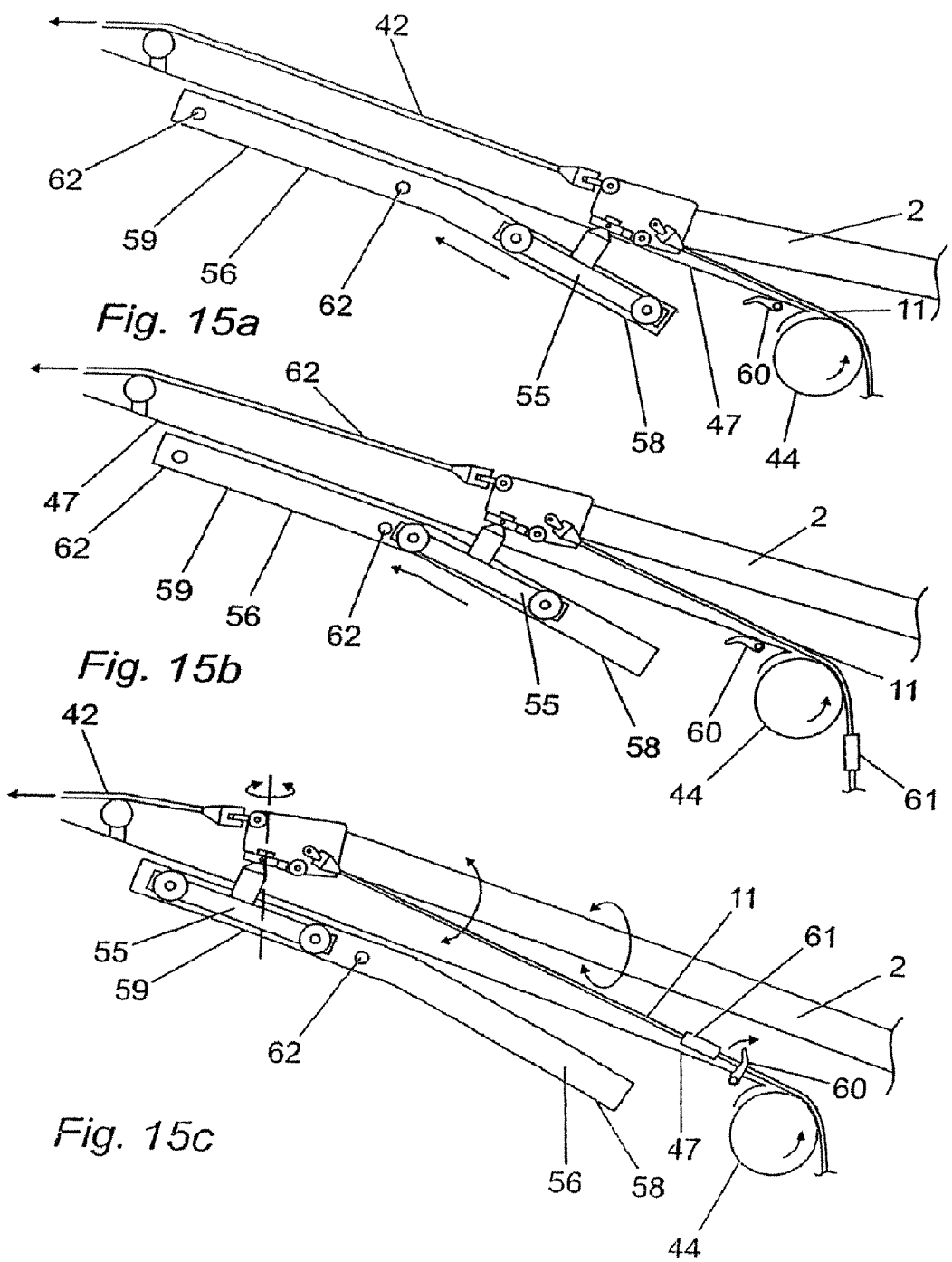
FIGS. 15(a)-(d) show the retrieval apparatus in operation.

FIGS. 15(a)-(d) show the steps of the yoke 2 being retrieved. In FIG. 15(a), the yoke 2 has been pulled up onto the ramp 47 as the recovery line 42 is wound onto its drum (not shown). With the carriage 55 in position in the lower portion 58 of the guide track 56, the lower end of the yoke 2 and the attachment block 51 come into contact. The coaxial bars 52 of the block 51 locate in the previously described slots 32 of the yoke 2. With the lower end of the yoke 2 now attached to and supported by the attachment block 51 and carriage 55, the carriage 55 moves up the guide track 56 as the winding recovery line 42 continues to pull the yoke 2 up the ramp 47. This stage is shown in FIG. 15(b), as the carriage 55 moves from the lower portion 58 to the upper portion 59 of the guide track 56.

Figure 15D:
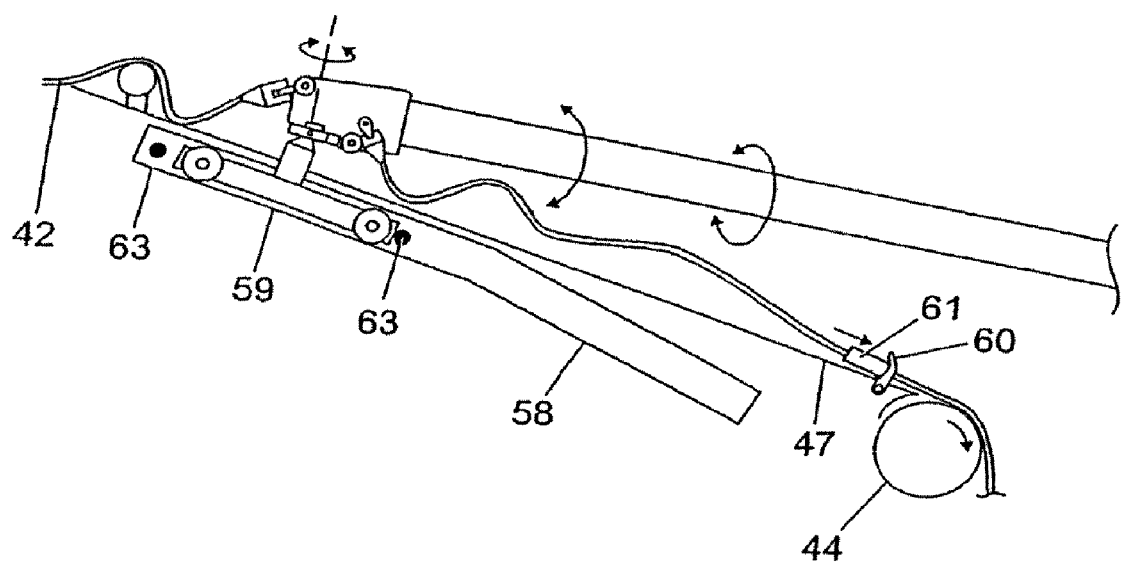

In each of FIGS. 15(a)-(d), it can also be seen that the connecting line 11 of the primary weight 10 is still connected to the yoke 2 and running up over the stern roller 44. The retrieval apparatus 45 may also be provided with a catch 60 on the ramp 47 in order to secure the connecting line 11 once it is disconnected from the yoke 2, as shown in FIGS. 15(c) and 17(d). In this instance, the connecting line 11 is provided with a sleeve 61 located at a point on the line 11 such that when the carriage 55 and yoke 2 reach the uppermost point of the guide track 56, the sleeve has been pulled up past the catch 60. The recovery line 42 can then be slackened a little so that the sleeve 61 hangs on the catch 60, as shown in FIG. 15(d). By doing this, the load of the connecting line 11 and primary weight 10 are then removed from the mechanical attachment joint 30 of the yoke 2. The attachment pin 31 and connecting line 11 may then be easily and safely removed from the yoke 2.

In addition, locking pins 63 may be located in holes 62 in the sides of the guide track 56 in order to lock the carriage 55 in position. Once this has been done, the recovery line 42 can also be disconnected from the yoke 2, and the WEC or other structure will then be held or towed directly through the block 51 and bearing 53. Any umbilical utility lines may also be disconnected from the yoke 2 at this point. Finally, the yaw line 14 can be disconnected from the WEC or structure using either a surface buoy or boat hook, as described below with reference to FIG. 16, or by some other remotely operated means. The yoke 2 and WEC 1 are now fully separated from the remainder of the mooring system. The yoke 2 and WEC are now ready for towing, as shown in FIG. 12(b). In order to reconnect the yoke 2 and the remainder of the mooring system, the steps described above are simply undertaken in reverse.

Figure 16A:
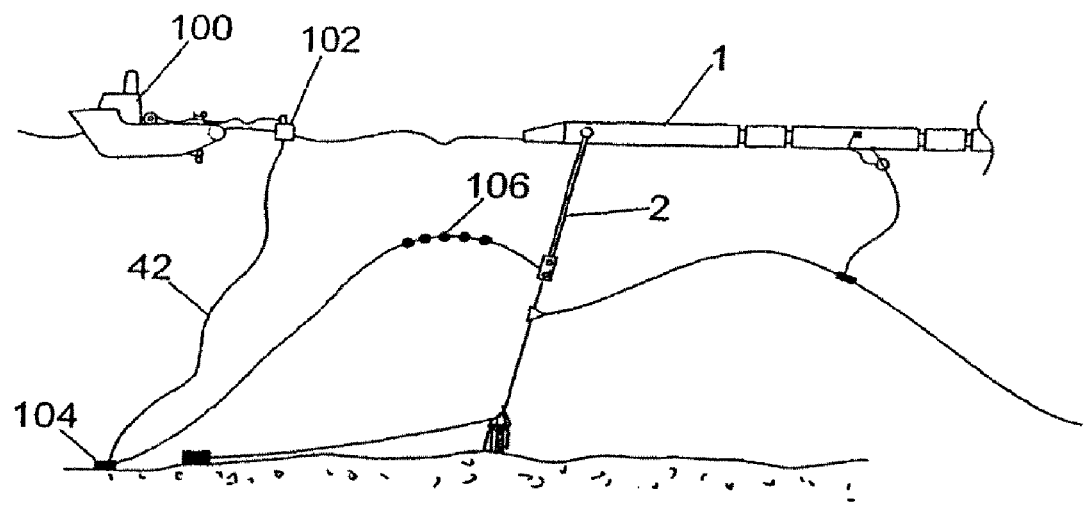
FIGS. 16(a)-(h) show the steps for retrieving the yoke component of the mooring system of FIG. 1 from the water.
Figure 16B:
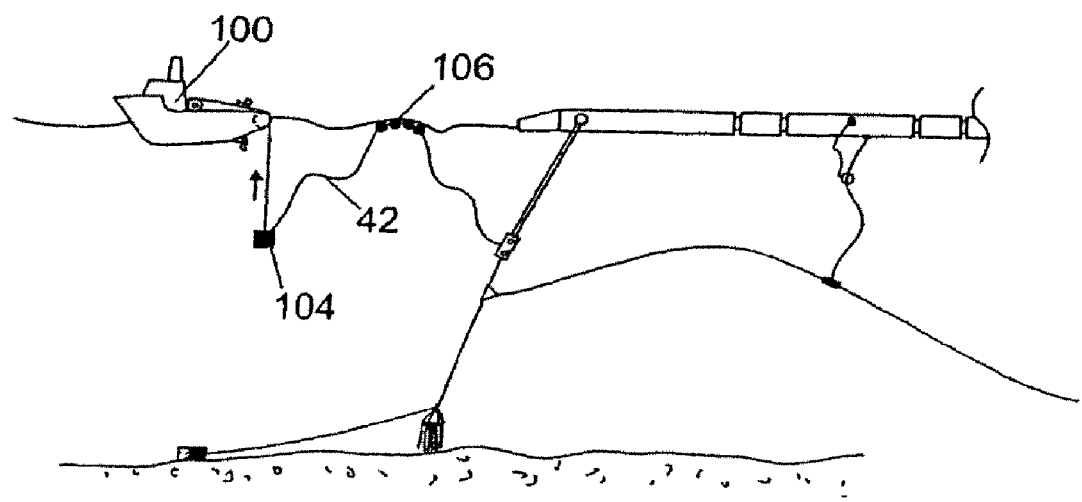

FIGS. 16(a)-(h) illustrate one method of recovering the yoke 2 and WEC 1 to a support vessel 100. As seen in FIG. 16(a), the WEC 1 is held by the mooring system as previously described. To aid recovery without having to have operators entering the water, a recovery line 42 is permanently attached to the lower end of the yoke 2 when the yoke 2 and WEC 1 are moored. The end of the recovery line 42 remote from the yoke 2 is held by a buoy 102. The recovery line may be provided with one or more clump weights 104 and/or buoyancy aids 106, as required. During this initial stage, the support vessel 100 arrives at the buoy 102. The remote end of the recovery line 42 is retrieved from the buoy 102 and is attached to its winding drum (not shown) on the vessel 100.

Figure 16C:
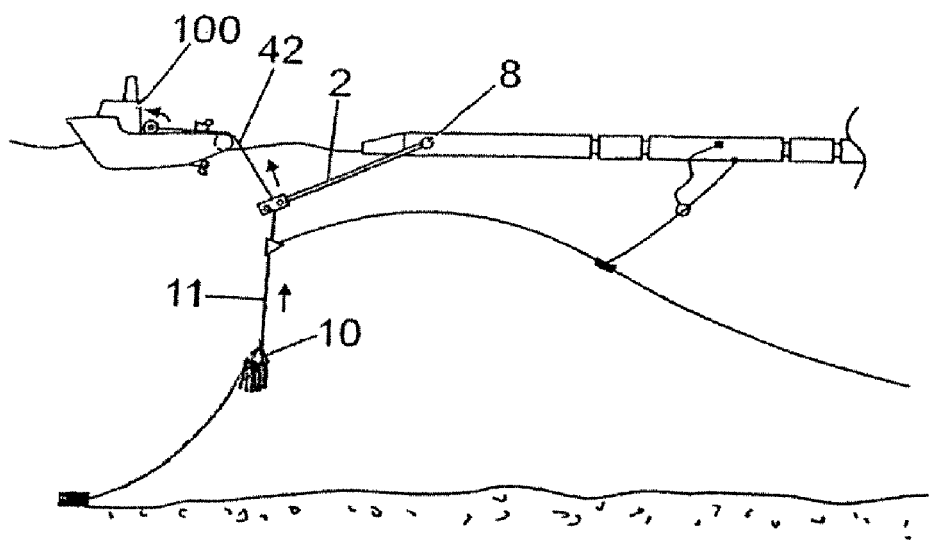
Figure 16D:
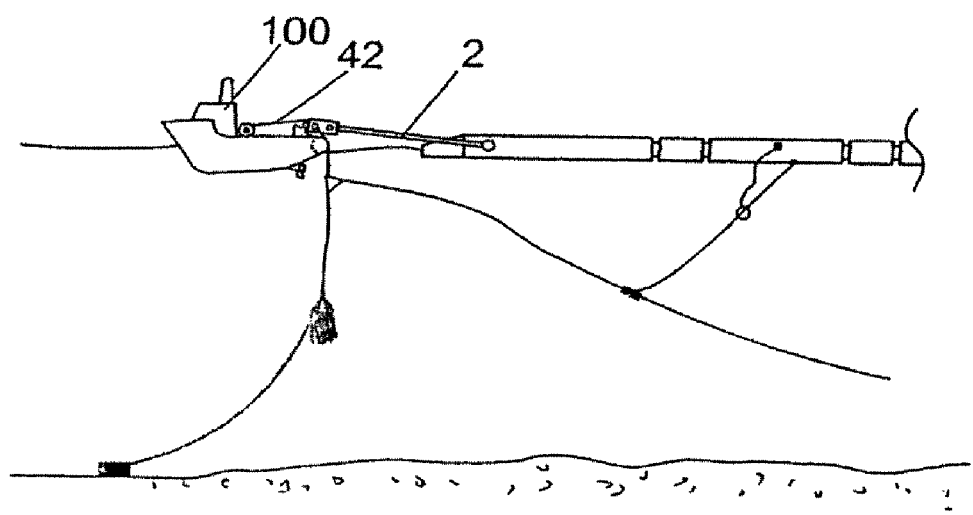
Figure 16E:
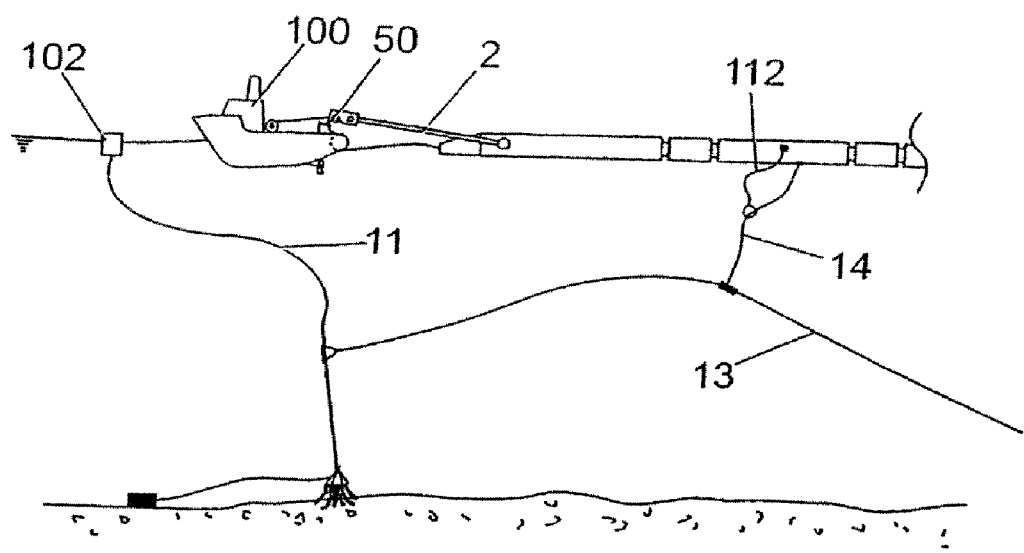

FIG. 16(b) shows the next stage of the recovery procedure. Once the recovery line 42 has been attached to the drum, the buoy 102 is retrieved and placed on the deck of the vessel 100. As the recovery line 42 is wound in, the clump weight 104 is lifted from the sea bed and rises towards the vessel 100. If fitted, the buoyancy aids 106 will also rise to the surface as the recovery line 42 is wound in. Once the recovery line 42 has been wound in enough to take up any slack in the line 42, it will then begin to raise the lower end of the yoke 2 towards the vessel 100. As the line 42 raises the lower end of the yoke 2, the yoke 2 will pivot about the axis of rotation 23 of the shaft 8, as shown in FIG. 16(c). With the pivoting of the yoke 2, the yoke 2 will raise the tether line 11 and associated tether weight 10. As seen in FIG. 16(d), the recovery line 42 will continue to be wound in until such time as the yoke 2 is recovered to the deck of the vessel 100, which is the state previously described with reference to FIGS. 12(b) and 15(c).

As illustrated in FIG. 15(d), the tether line 11 can be disconnected from the yoke 2 along with any other lines or umbilicals once the yoke is attached to the attachment mechanism 50. To prevent the tether line 11 sinking to the sea bed once it has been disconnected, it is attached to the buoy 102 and the buoy is replaced in the water, which is the state shown in FIG. 16(e).

Figure 16F:
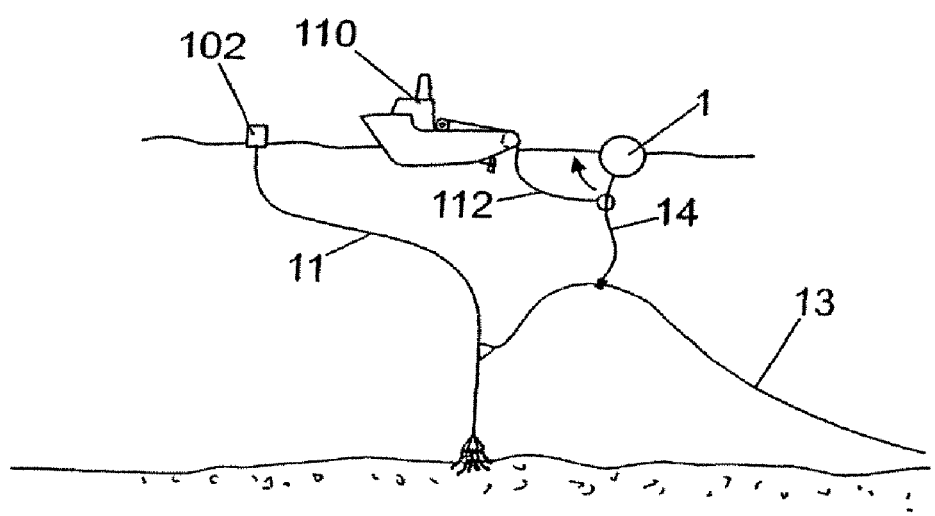
Figure 16G:
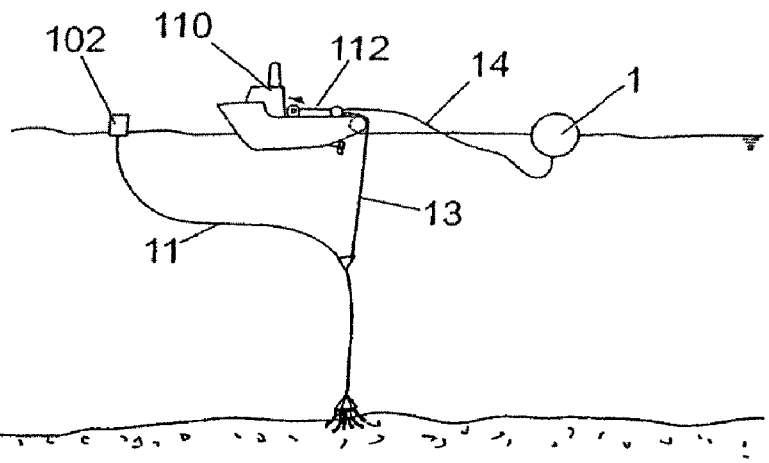
Figure 16H:
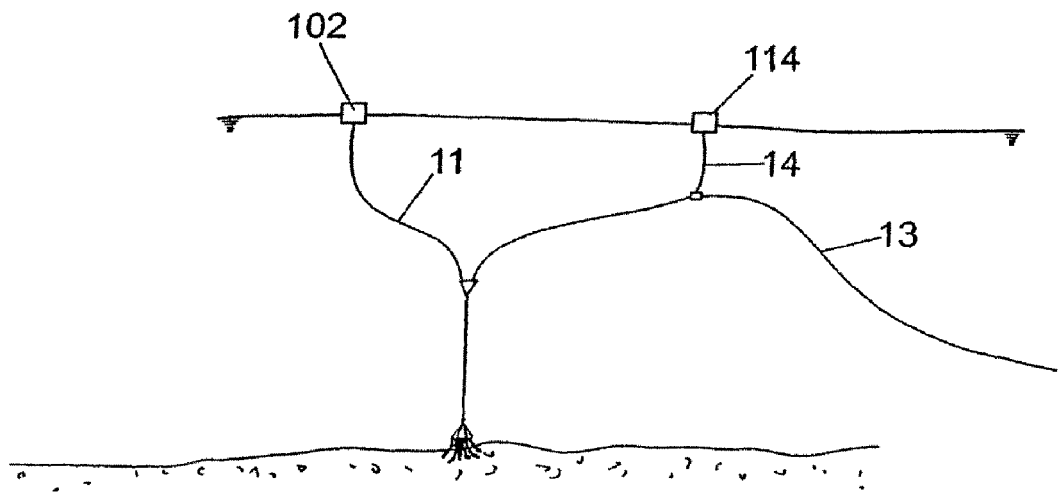

At the same time as the vessel 100 is undertaking the steps shown in FIGS. 16(a)-(e), a second vessel 110 is used to detach the rear anchor and yaw lines 13, 14 from the WEC 1. This is shown in FIGS. 16(f) and 16(g), which illustrate schematic end views of the mooring system and WEC 1. A second recovery or chaser line 112 is attached by a first end to the WEC 1 and by a second end to the yaw line 14. The second vessel 110 recovers the first end from the WEC 1 and winds in the chaser line 112, as shown in FIG. 16(f). As the chaser line 112 is wound onto the second vessel 110, the rear anchor and yaw lines 13, 14 are also recovered onto the second vessel 110, as illustrated in FIG. 16(g). Once on the second vessel 110, the rear anchor and yaw lines 13,14 can be disconnected and replaced in the water attached to a further buoy 114, as shown in FIG. 16(h).

Figure 17A:
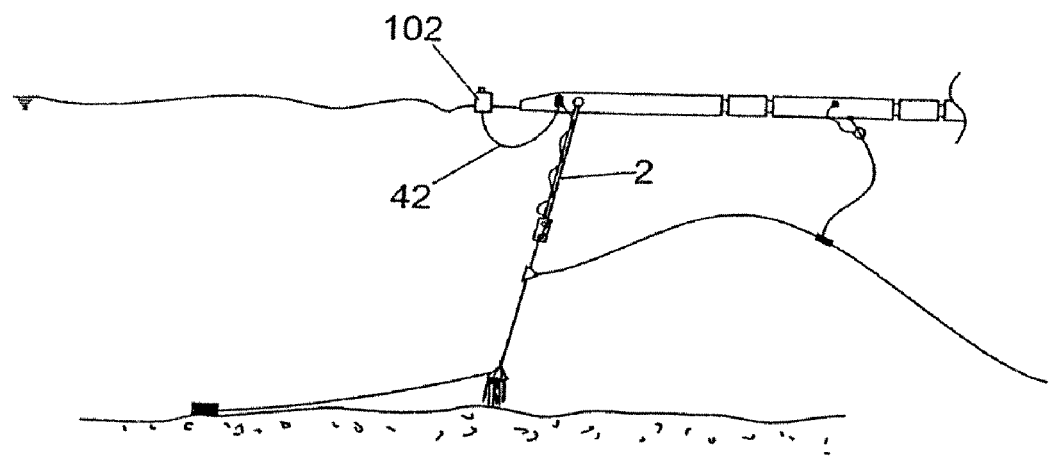
FIGS. 17(a) and 17(b) show alternative steps for retrieving the yoke component of the mooring system of FIG. 1.
Figure 17B:
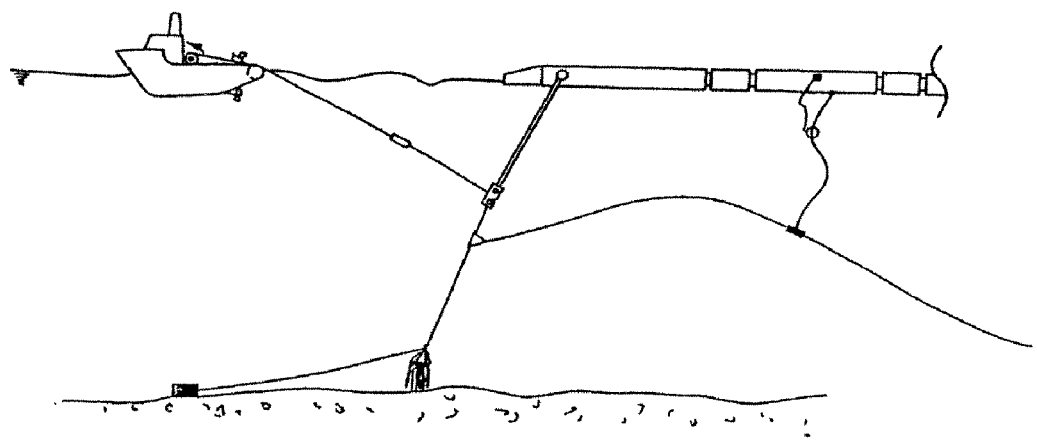

FIGS. 17(a) and 17(b) show an alternative arrangement, in which the recovery line 42 is clipped to the yoke 2. By clipping the recovery line 42 to the yoke 2, there is no need for the recovery line 42 to be provided with clump weights or buoyancy aids. It can simply be unclipped from yoke 2 and recovered in the same way as described with reference to FIG. 16.

Figure 18:
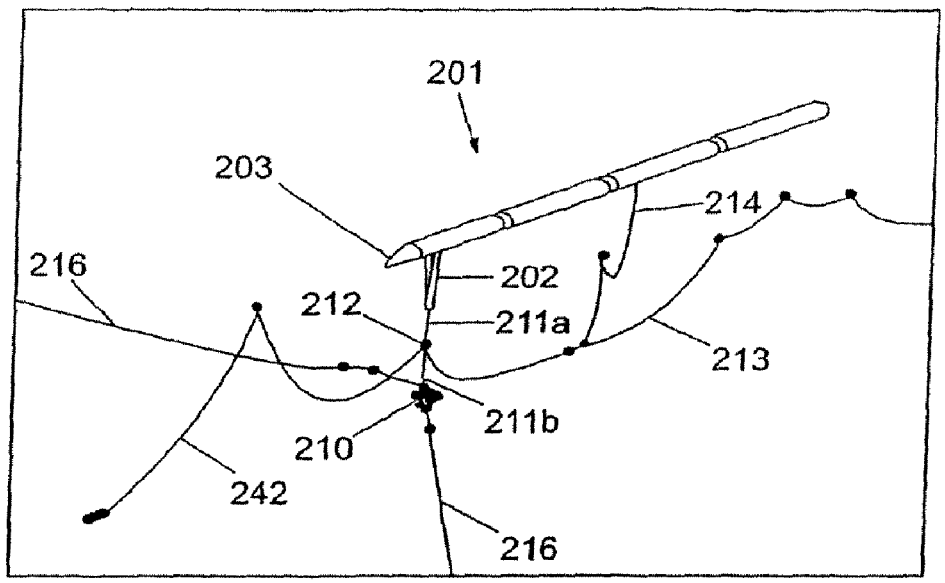
FIG. 18 shows a schematic view of a second embodiment of a mooring system.

FIG. 18 shows a second embodiment of a mooring system in accordance with the present invention. The mooring system in FIG. 18 shares a number of components with the mooring system previously described, and these features will be assigned the same reference numerals, but with a 2-prefix. Further description of certain components is not considered necessary given their description above.

As with the previously described embodiment, this second embodiment of a mooring system is shown in FIG. 18 mooring a WEC 201. The mooring system has a pivoting harness or yoke 202 at the front end 203—that is, the end facing in the direction of the anticipated wave action or current—of the WEC 201. Where the second embodiment differs from the previous embodiment is that attached to the yoke 202 below are first and second connecting or tether weight lines 211A, 211B, rather than a single connecting line. Connecting together the first and second connecting lines 211A,211B is a link plate 212, which will be described in more detail below. The primary or tether weight 210 is hung from the second connecting line 211B. As before, first or front anchor lines 216 are attached to the tether weight arrangement 210 and have first or front anchors (not shown) of a known type at the ends of the front anchor lines 216 remote from the tether weight arrangement 210.

A recovery line 242 incorporating a suitable float is also connected to the link plate 212 to facilitate recovery of the WEC 201. Also connected to the link plate 212 is a second or rear anchor line 213 and its associated second or rear anchor (not shown), again of a known type. A support or yaw line 214 is also connected between the WEC 201 and the rear anchor line 213 to help stabilise the WEC 201.

Figure 19:
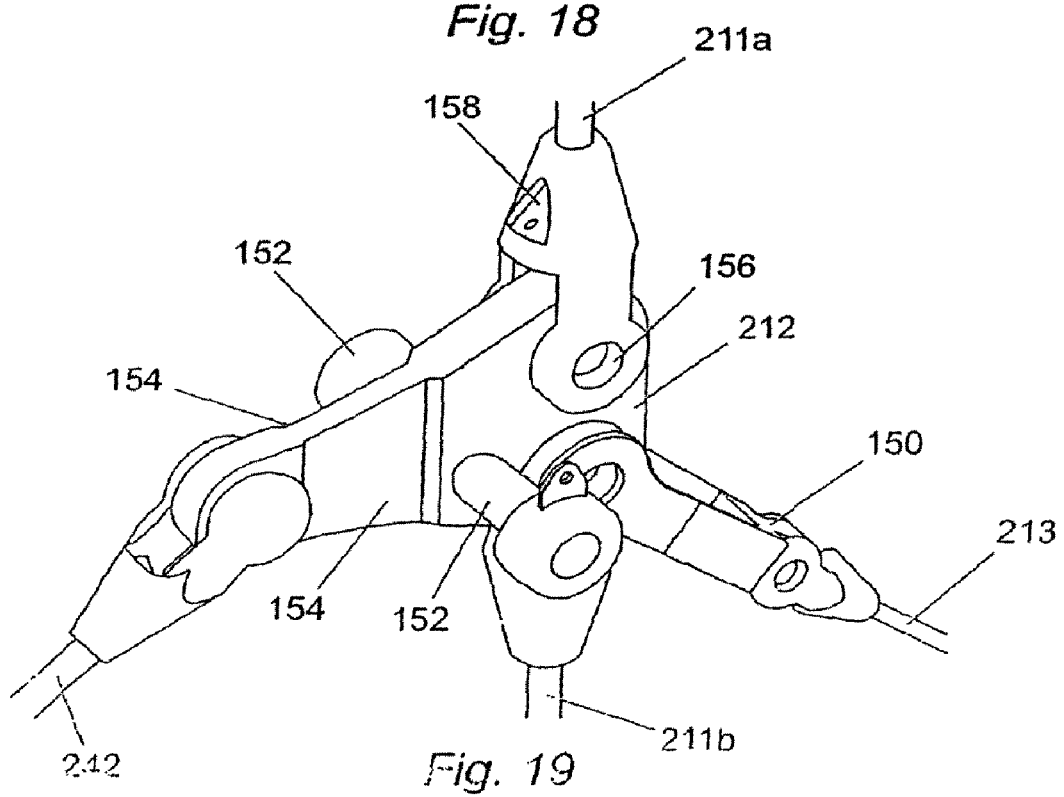
FIG. 19 shows a detail view of a link plate used in the mooring system shown in FIG. 18.

The link plate arrangement of the second embodiment is shown in detail in FIG. 19. As can be seen, the link plate 212 has a generally triangular shape and has four connection points for connecting together the first and second connecting lines 211A,211B, rear anchor line 213 and recovery line 242. Rear anchor line 213 is connected to the link plate 212 via a connection fork 150. Stabiliser bars 152 are also provided either side of the link plate 212 to ensure it remains stable when removed from the water.

The link plate 212 makes the connections between all the main lines in the mooring system. Thanks to the generally triangular shape of the plate 212 and the stabiliser bars 152, the plate 212 can be easily retrieved over the stern or stern roller of an installation/removal vessel. As well as the stabiliser bars 152, each side of the link plate 212 is also provided with a channel 154. By providing the plate 212 with substantially identical channels 154 on either side, the plate 212 can be locked in KARM forks or similar.

The link plate 212 and rear anchor line connection fork 150 give a clean load of wires back over a stern roller. The first connecting line 211A is provided with a hang-off pad-eye 158 to allow tow loads to be taken off the connection pin 156. The connection pin 156 is extracted remotely using a wire or hydraulic ram to avoid having personnel operating near the mooring system as the pin 156 is removed.

Figure 20A:
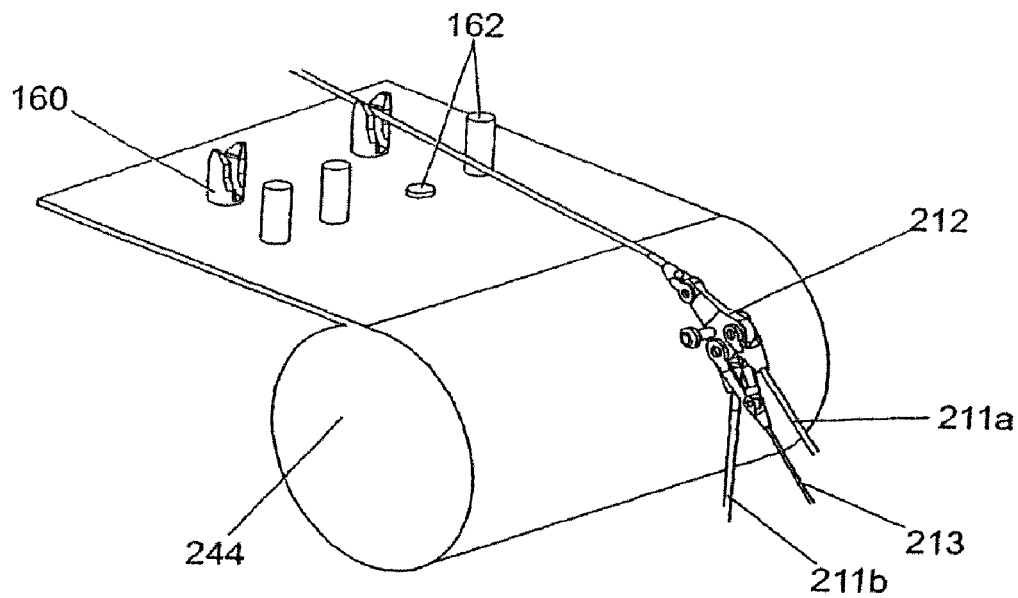
FIGS. 20(a) and 20(b) show schematic views of the mooring system of FIG. 18 being retrieved to a vessel.
Figure 20B:
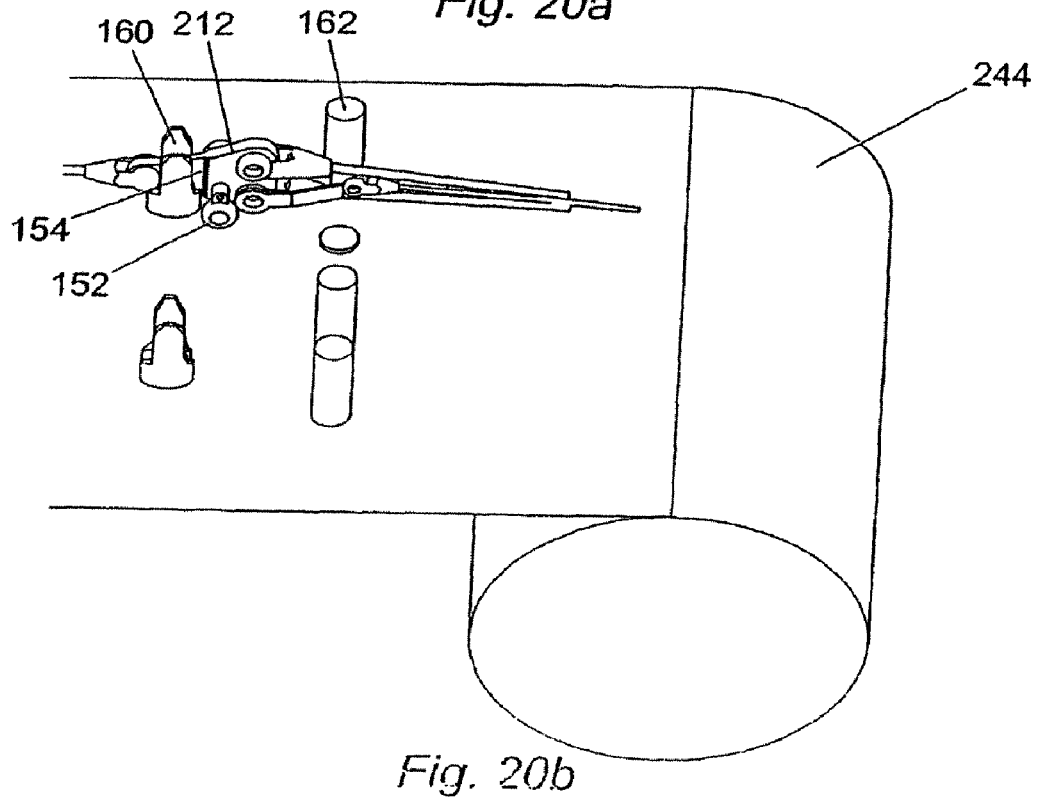

FIGS. 20(*a*) and 20(*b*) show schematically how the second embodiment of the mooring system is retrieved onto the deck of a support vessel. As with the previously described embodiment, the recovery line 242 is first retrieved, preferably via a float, and is wound onto a drum or the like on the vessel. In winding in the recovery line 242 the link plate 212 and other lines 211A,211B,213 are also pulled towards the vessel as well. As the link plate 212 reaches the vessel, as seen in FIG. 20(*a*), it slides onto the deck of the vessel. To assist the retrieval, the vessel may have a recovery roller 244 at the stern.

Once on the deck of the vessel, as shown in FIG. 20(*b*), the generally triangular shape of the link plate 212 and stabiliser bars 152 provided thereon allow the link plate 212 to slide across the deck with relatively little friction and no twisting, thus ensuring that the various lines 211A,211B,213 do not become entangled with one another. The deck of the vessel is provided with KARM forks 160 or a similar locking arrangement to hold the link plate 212 on the deck so that the lines 211A,211B,213 can be detached. As shown best in FIG. 19, the link plate 212 has channels 154 either side thereof which receive the KARM forks 160. Additionally, guide rollers 162 can also be provided on the deck to ensure that the link plate 212 passes over the KARM forks 160 when being retrieved.

Figure 21:
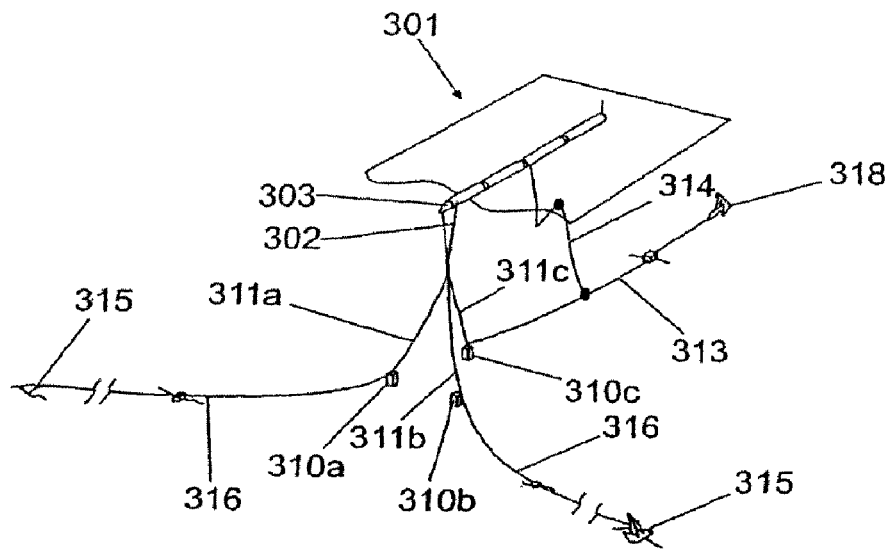
FIG. 21 shows a schematic view of a third embodiment of a mooring system.

FIG. 21 shows a third embodiment of a mooring system in accordance with the present invention. This third embodiment shares a number of components with the previously described first and second embodiments and as before is shown mooring a WEC 301. The mooring system has a pivoting harness or yoke 302 at the front end 303—that is, the end facing in the direction of the anticipated wave action or current—of the WEC 301. Where this third embodiment differs from the previous embodiments is that attached to the second end of the yoke 302 are first, second and third connecting or tether weight lines 311A,311B,311C. At the end of each connecting line 311A,311B,311C is attached a respective primary or tether weight 310A,310B,310C. Attached to the first and second tether weights 310A,310B are first or front anchor lines 316 which have first or front anchors 315 at the remote ends thereof. Attached to the third tether weight 310C is the second or rear anchor line 313 and its associated second or rear anchor 318, again of a known type. A support or yaw line 314 is also connected between the WEC 301 and the rear anchor line 313 to help stabilise the WEC 301.

Figure 22:
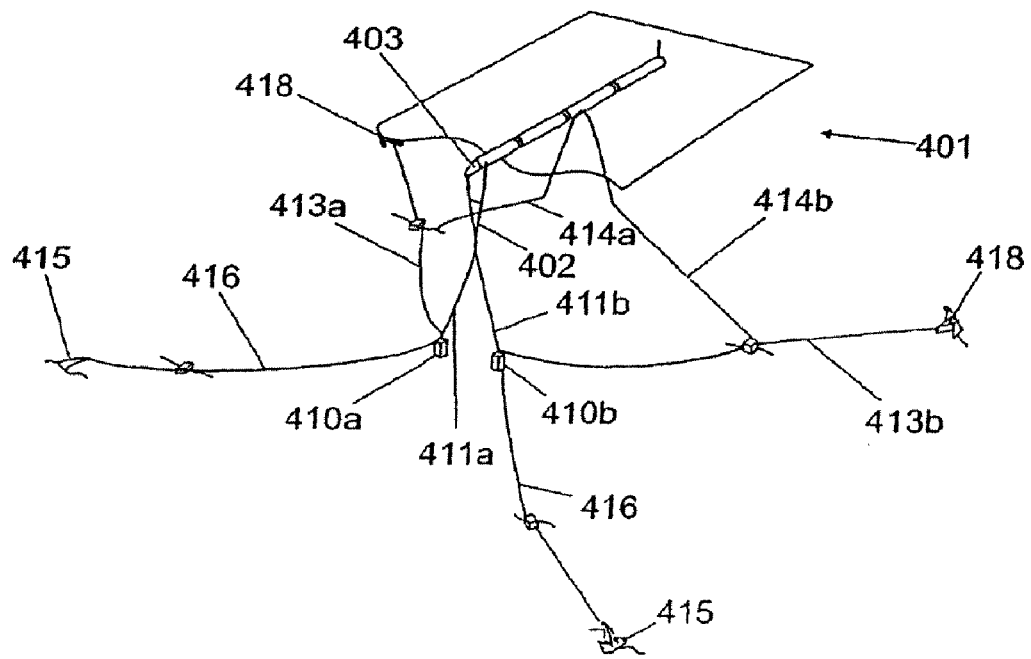
FIG. 22 shows a schematic view of a fourth embodiment of a mooring system.

A fourth embodiment of the mooring system of the present invention is shown in FIG. 22. As before, this fourth embodiment shares a number of components with the previously described embodiments and as before is shown mooring a WEC 401. The mooring system has a pivoting harness or yoke 402 at the front end 403—that is, the end facing in the direction of the anticipated wave action or current—of the WEC 401. The fourth embodiment differs from the previous embodiments in that attached to the second end of the yoke 402 are first and second connecting or tether weight lines 411A,411B. At the end of each connecting line 411A,411B is attached a respective primary or tether weight 410A,410B. Attached to the first and second tether weights 410A,410B are first or front anchor lines 416 which have first or front anchors 415 at the remote ends thereof. Also attached to each tether weight 410A,410B are respective second or rear anchor lines 413A,413B and their associated second or rear anchors 418. Support or yaw lines 414A,414B are also connected between the WEC 401 and the rear anchor lines 413A,413B for stabilising the WEC 401.

Figure 23:
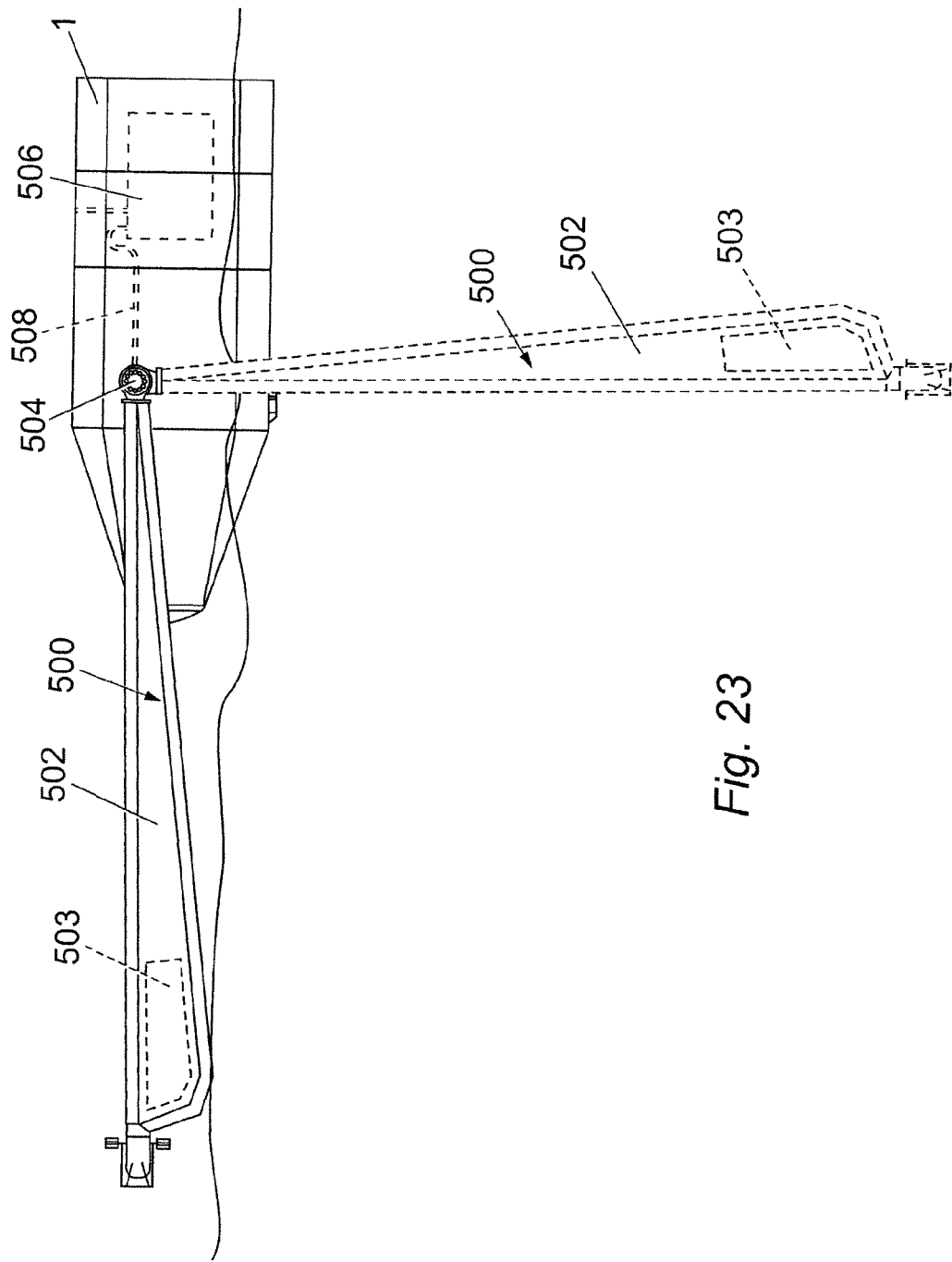
FIG. 23 shows an alternative embodiment of a yoke for use in the mooring system of the present invention.

FIG. 23 shows an alternative embodiment of a mooring yoke, or harness, for a floating aquatic structure. The alternative harness is also suitable for use in the mooring system of the present invention. The majority of the features of the harness, which is generally designated 500, are shared with the first embodiment of the harness described in FIGS. 3, 6,7 and 8. Consequently, the harness 500 comprises a pair of hollow arm members 502 which are connected together at their lower end, although only one of the arm members 502 is shown in the side elevation of FIG. 23. The first or upper ends of the arm members 502 are also connected to respective ends of a shaft member 504 which extends transversely across the WEC 1 or other floating aquatic structure. Although not shown in FIG. 23, the harness 500 may also be provided with one or more crossbrace members which allow the harness 500 to spread the mooring loads. The harness 500 is pivotable about the transverse shaft 504 relative to the WEC 1 over the same range of angles as the first embodiment of harness. This range of angles includes a position lying on the surface of the water (shown in solid lines in FIG. 23) and a substantially vertical position underwater (shown in broken lines in FIG. 23).

Where this alternative embodiment of the harness 500 differs from the earlier embodiment is that the hollow legs 502 of this harness 500 each contain one or more buoyancy chambers 503 and the harness further comprises a buoyancy control system which allows for the remote deployment and retrieval of the harness 500. The buoyancy control system 506 is preferably housed in the WEC 1 and is connected to the hollow legs 502 of the harness by one or more flow lines 508. The buoyancy control system 506 can selectively fill the buoyancy chambers 503 within the legs 502 with water or compressed gas in order to decrease or increase buoyancy of the harness 500.

Figure 24:
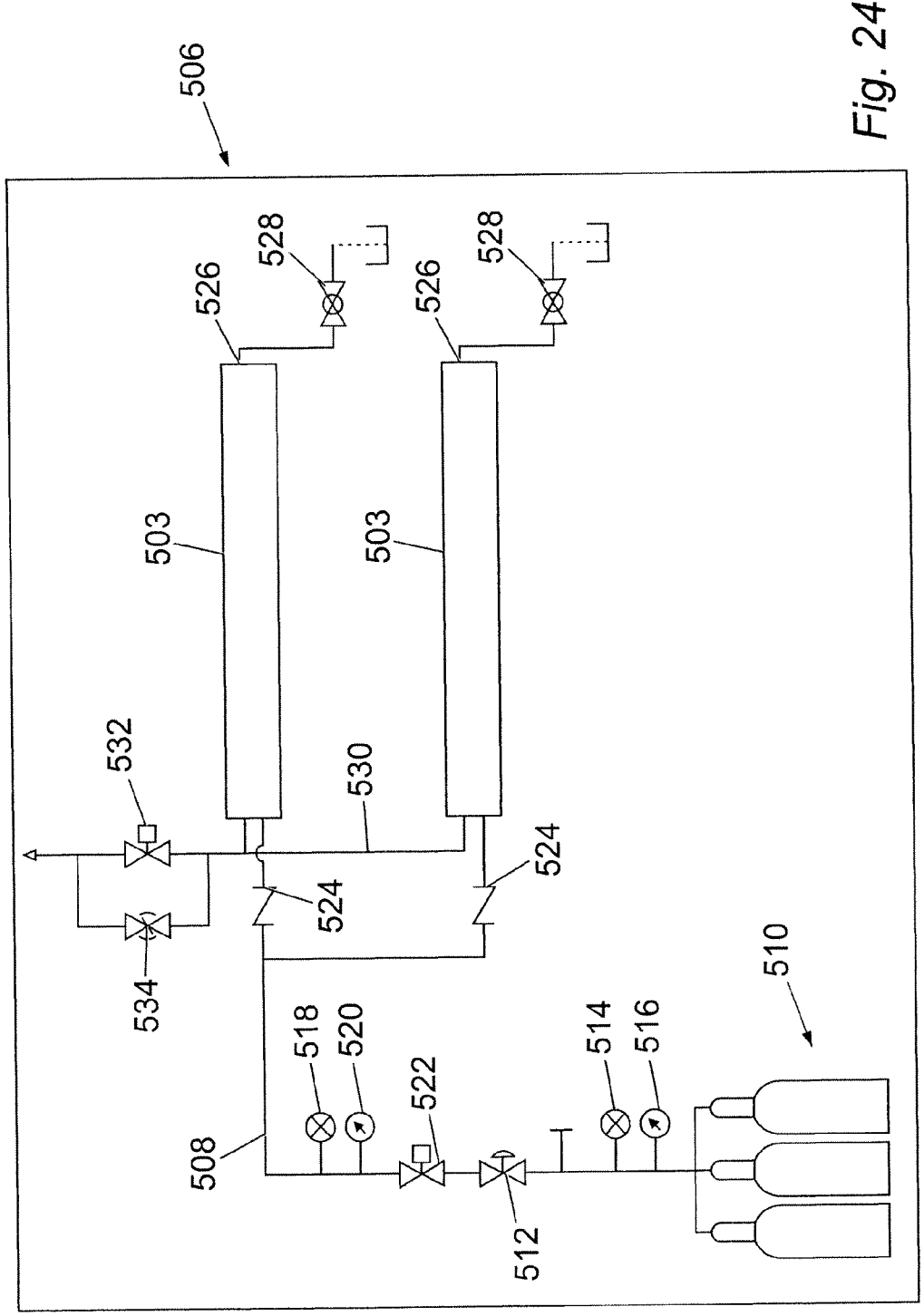
FIG. 24 is a schematic view of a buoyancy control system for use with the yoke of FIG. 23.

FIG. 24 schematically shows the buoyancy control system 506 in more detail. A pressurised gas supply 510 is housed on, or preferably in, the floating aquatic structure to which the harness is attached. The gas supply 510, which in this embodiment is in the form of one or more gas canisters, is connected to the pair of buoyancy chambers 503 by a flow line 508. The flow line 508 is divided into high- and low-pressure sides by a pressure regulator 512, which regulates the pressure in the flow line 508 so that it does not go above a predetermined maximum pressure (e.g. 3 bar). Also provided on the high-pressure side of the flow line 508 are a high-pressure sensor 514 and gauge 516 which allow monitoring of the pressure on the high-pressure side. A corresponding low-pressure sensor 518 and gauge 520 are provided on the low-pressure side of the flow line 508. A remotely controlled fill valve 522 controls the flow of gas through the low-pressure side into the buoyancy chamber 503.

Immediately upstream of each chamber 503 is a check valve 524 which prevents a return flow of gas out of each chamber 503 up the flow line 508. Orifices 526 are provided at the opposite end of each chamber 503 from the gas inlets. The orifice 526 in each chamber 503 opens to atmosphere through each leg 502. Each orifice 526 is located at the rear of the leg 502 and close to the lowest point on the leg 502. The orifices 526 allow any water contained in the chambers 503 to be expelled. The orifices 526 may each be provided with a ball valve 528 or alternative valve means to keep the orifices closed, which is preferable during prolonged maintenance periods for example.

Each chamber 503 also includes a vent line 530 for venting gas from the chambers 503. Flow of gas through the vent lines 530 is controlled by a remotely controlled vent valve 532 which can open in order to allow gas to vent from the chambers 503 to atmosphere. Connected to the vent lines 530 in parallel with the vent valve 532 is a pressure relief valve 534, which will automatically open to vent the chambers 503 in the event of that the pressure in the chambers 503 rises above a predetermined maximum value.

The operation of the buoyancy control system will now be described. When the aquatic structure is to be towed to its desired position the harness should preferably be buoyant. To ensure buoyancy the fill valve 522 is opened and the pressurised gas passes through the regulator 512 and fill valve 522 into the low-pressure side of the flow line 508. As the gas approaches the chambers 503 it passes through the check valves 524 which prevent any of the gas returning upstream. The gas then enters the chambers 503 defined within each hollow leg 502 and any water within the chambers 503 is forced out through the orifices 526. The gas in each chamber 503 forces the legs 502 to rise towards the surface of the water. The gas in each chamber 503 is prevented from leaving the chamber 503 and vent line 530 by the closed vent valve 532 and relief valve 534, and the resultant equilibrium between the internal gas and the external water means that gas cannot leave via the orifices 526 either. When the operator notes that the harness 500 is in a substantially horizontal position on the surface of the water (as shown in solid lines in FIG. 23), the fill valve 522 will be closed.

Once the structure has been placed in the correct location the harness 500 will be disconnected from the towing vehicle and must now be vented so it can perform the roll stability function in the same manner as the first embodiment of harness. To do this the vent valve 532 is opened and the gas is allowed to vent to atmosphere from each chamber 503 along vent line 530. As the gas vents, water will begin to once again flow into each chamber 503 via the orifices 526. As the chambers 503 fill with water, the legs 502 will become heavier and the harness 500 will pivot about its shaft 504 until reaching the substantially perpendicular position (as shown in broken lines in FIG. 23). The harness 500 is then in the correct position to increase roll stability in the floating structure. At the point when it is desired to retrieve the harness 500 once again, the initial gas fill procedure is carried out once again in order to bring the harness pivoting back to the surface.

The present invention allows a large array of machines to be installed on the same site. This helps reduce costs as the WECs or other structures can share anchor points. In particular, it is desirable for WECs to be spaced closely. Thus, a mooring system such as that of the present invention which has a small spread between anchor points is advantageous. In addition, the mooring system of the present invention provides a large dynamic range of motion which is sufficient to cope with extreme waves while minimising extreme loads on the system and anchors.

The mooring system can also provide restraint to other forms of motion such as yaw. This allows the system to respond to the incident waves while avoiding complete rotation about the mooring axis which would require expensive and potentially unreliable assemblies for electrical (or other) interconnection.

The mooring system also combines a number of reaction means on the seabed to address different wave- or current-induced loads. Wave loading is characterised most of the time by small, steady and unsteady drift loads due to wave action on the machine/installation. However, in very large and extreme seas very large loads occasionally may be experienced. Small lightweight solid secondary or clump weights provide sufficient reaction for small normal loads accounting for the vast majority of operating conditions and are cheap and easy to deploy in large numbers. The reaction provided by these small weights can be effectively augmented for extreme conditions by the use of conventional embedment anchors, conventional or suction piles, larger clump weights, or by the interlinking of smaller clump weights. Alternatively a weighted suction pile provides both means of reaction where the sea bed is of a suitable composition—the mass of the pile provides adequate reaction for small waves and under the action of extreme loads the suction of the pile in the seabed provides large resistance to short-term large loads.

A further benefit of the present invention comes from the use of a pivoting harness/yoke assembly or linking plate member to provide a means of mechanical connection and disconnection of the structure to/from the mooring system. This allows the structure to be connected or disconnected in rough seas without having to have personnel board the structure itself. The pivoting yoke mechanism or linking plate can be recovered to the deck of an installation/recovery vessel by retrieval of the recovery line remote from the machine and the various connections can then be attended to from the comparative safety of the vessel. Such a provision is vital to allow intervention activities to be carried out safely in large seas, thereby reducing the weather dependence of these operations and the associated cost and risk. The yoke assembly also provides restraint to the WEC or structure in combination with the suspended tether weight(s). As illustrated in FIG. 6, and in particular for a WEC, the harness and tether weight provide additional roll restraint to the moored structure. This is beneficial as it reduces the requirement for ballast on or in the structure to provide roll stability. The reduction in the ballast required can reduce the size, mass and volume of the structure, directly reducing the cost thereof.

Furthermore, the provision on the yoke of the electrical or other (e.g. hydraulic or pneumatic) utility interconnections alongside the mechanical attachment means ensures that these can be connected or disconnected at the same time as the mechanical attachment without personnel having to board the WEC or other marine/offshore installation. This means that adjacent machines may be connected in an array 'mid-water'. That is to say that the umbilical lines connect adjacent machines via the lower ends of the yokes without contact with the seabed. This greatly eases the tasks of installing, inspecting and repairing the electrical or other interconnection, reducing cost and increasing reliability.

Providing a yoke or harness with a buoyancy control system means that the deployment and retrieval of the harness are much easier. The buoyancy of the harness can be increased or decreased remotely, without any need for handling lines to be attached or detached. No winching machinery is therefore needed to haul up or release the harness.

A benefit is also provided in connecting the rear anchor line to the lower end bottom of the yoke or the linking plate member. In this way, connection or disconnection of the rear anchor line can be done at the same time as the connection or disconnection of the main connecting line(s). For the WEC machine of the illustrated embodiments, the rear anchor line acts as a surge restraint to prevent the system surging forward under the action of small waves from an offshore direction, or tidal currents when waves are small. Sufficient slack in the complete system is provided to allow the lower end of the yoke or linking plate to be recovered to the deck of a support vessel without moving or recovering any of the anchor/reaction points.

The use of heavy suspended tether weights hanging from the end of the yoke and linked to the main mooring lines is also advantageous, as this is what provides the means of restraint to the system. The combination of the yoke, tether line(s) and tether weight(s) behaves like a pendulum to provide location restraint to the system being moored. The tether weights are effectively fixed in location by the main mooring lines. The system provides a 'soft' or low-rate spring restraint which stops 'snatching' of the mooring lines under extreme motions.

The new arrangement of tether weight used in the present invention also has advantages of known arrangements. The tether weight of the present invention can descend to, rest on and rise from the sea bed with progressive loss and recovery of suspended weight. This is done thanks to the suspended and interlinked chain segments. The new tether weight can rest close to (or even partially on) the seabed, maximising the length of the tether assembly and, as a result, its range of motion for a given range of tether/yoke angle to the vertical. This allows the mooring system of the present invention to be used in siting WECs or other installations in shallower water depths near the shore/coastline and in energetic wave regimes.

The provision of the retrieval apparatus on the back of the support vessel ensures that the lower end of the yoke or linking plate can be recovered onto the back of the support vessel without direct human intervention. This allows the mechanical connections between the yoke or linking plate and the remainder of the mooring system and also the umbilical utility lines to be attached or detached in safety from the deck of the support vessel. Thus, personnel do not need to board the WEC or other structure/installation in heavy seas or similarly adverse conditions.

Although the tether weights of the illustrated embodiments are shown suspended off the sea bed in the rest position, they may alternatively be partially resting on the sea bed in the rest position. It should also be understood that additional clump weights or any other form of anchorage such as suction anchors or piles may be used in addition to or instead of the conventional anchors described above. As regards the recovery procedure illustrated in FIG. 16, the rear anchor and yaw lines may be disconnected prior to the disconnection of the tether line. In this way, the same vessel could do both tasks and there would be no need for a second vessel. Finally, the recovery lines used in the recovery procedure can be attached to the WEC or structure by release means which are remotely controlled. The lines can therefore be remotely released from the WEC and then recovered to the vessel without intervention required on the machine.

The buoyancy control system which comprises part of the alternative embodiment of the mooring harness may be provided with auxiliary flow lines accessible from the exterior of the aquatic structure. These auxiliary lines allow an operator to control the buoyancy system from the structure in the event that there is a failure in the remote control system. Furthermore, the pressures in the buoyancy system may be continually monitored in order to generate a warning should there be a component failure within the buoyancy system.

These and other modifications and improvements may be made without departing from the scope of the invention.

What is claimed:

1. A rigid harness for a floating aquatic structure, the harness comprising:
   first and second ends, the first end being pivotably attachable to the structure such that in use the harness may pivot about a single pivot axis through a range of angles relative to, and including, the vertical;
   one or more mechanical and/or umbilical connections adjacent the second end;
   a frame formed from a pair of arm members and a pivot shaft, wherein each arm member has first and second ends and at least one buoyancy chamber, and the pivot shaft defines the pivot axis and is connected between the respective first ends of the arm members to form the first end of the harness; and
   a buoyancy control system adapted to vary the buoyancy of the harness by selectively filling or venting each buoyancy chamber.

2. The harness of claim 1, wherein at least one of the arm members and the pivot shaft are hollow.

3. The harness of claim 2, further comprising one or more umbilical lines located in the hollow arm member and/or pivot shaft, wherein each umbilical line has a first end connectable to the structure and a second end having an umbilical connection connectable to a remote supply line.

4. The harness of claim 3, wherein the or each umbilical connection comprises a junction box having one or more connectors therein.

5. The harness of claim 1, wherein the pivot axis is transverse to the longitudinal axis of the structure.

6. The harness of claim 1, wherein in use the harness is adapted to apply roll restraint to the structure.

7. The harness of claim 1, wherein the second end of the harness includes retrieval means adapted to facilitate retrieval of the harness from a body of water.

8. The harness of claim 7, comprising a first mechanical connection connectable to a tether line, and wherein the retrieval means comprises a second mechanical connection connectable to a recovery line.

9. A mooring system for a floating aquatic structure, the system comprising:
   a harness according to claim 1;
   at least one primary weight removably attached to a tether line and suspended on the tether line from the second end of the frame; and at least one first anchor removably attached to the primary weight by at least one first anchor line.

10. The mooring system of claim 9, wherein the first anchor is adapted to resist movement of the structure in a first direction, and the system further comprises a second anchor removably attached to the tether line by at least one second anchor line, the second anchor being adapted to resist movement of the structure in a second direction substantially opposite to the first direction.

11. The mooring system of claim 9, the system comprising at least two first anchors removably attached to the primary weight by respective first anchor lines.

12. The mooring system of claim 9, wherein the primary weight includes at least two line attachment means adapted to mechanically attach the tether line and at least one first anchor line thereto.

13. A wave energy convertor including a mooring system according to claim 9 connected thereto.

14. A wave energy convertor including a harness according to claim 1 pivotably attached thereto.

* * * * *